US009973320B2

(12) United States Patent
Choi et al.

(10) Patent No.: US 9,973,320 B2
(45) Date of Patent: *May 15, 2018

(54) METHOD AND APPARATUS FOR TRANSMITTING CHANNEL STATE INFORMATION IN WIRELESS COMMUNICATION SYSTEM

(71) Applicant: Samsung Electronics Co., Ltd., Suwon-si, Gyeonggi-do (KR)

(72) Inventors: Seunghoon Choi, Suwon-si (KR); Youngbum Kim, Seoul (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/269,389

(22) Filed: Sep. 19, 2016

(65) Prior Publication Data
US 2017/0005774 A1 Jan. 5, 2017

Related U.S. Application Data

(63) Continuation of application No. 14/243,241, filed on Apr. 2, 2014, now Pat. No. 9,450,737.

(30) Foreign Application Priority Data

Apr. 3, 2013 (KR) .................. 10-2013-0036550
May 2, 2013 (KR) .................. 10-2013-0049184
(Continued)

(51) Int. Cl.
*H04L 5/00* (2006.01)
*H04L 1/00* (2006.01)
(Continued)

(52) U.S. Cl.
CPC ........... *H04L 5/0073* (2013.01); *H04B 7/265* (2013.01); *H04L 1/0026* (2013.01);
(Continued)

(58) Field of Classification Search
CPC . H04W 72/082; H04W 72/042; H04W 24/10; H04L 5/0057; H04L 5/0092; H04L 5/0096
See application file for complete search history.

(56) References Cited

U.S. PATENT DOCUMENTS

2009/0238121 A1   9/2009 Kotecha
2012/0093012 A1*  4/2012 Pedersen .............. H04B 7/0626
                                              370/252
(Continued)

FOREIGN PATENT DOCUMENTS

CN          1867177 A      11/2006
CN        101521563 A       9/2009
(Continued)

OTHER PUBLICATIONS

3GPP TR 36.828 v11.0.0, 3GPP; TSGRAN; E-UTRA; Further enhancements to LTE Time Division Duplex (TDD) for Downlink-Uplink (DL-UL) interference management and traffic adaptation (Release 11), Jun. 2012.
(Continued)

*Primary Examiner* — Romani Ohri
(74) *Attorney, Agent, or Firm* — Jefferson IP Law, LLP

(57) ABSTRACT

A method of transmitting channel information by a User Equipment (UE) when an uplink sub-frame is used for downlink transmission in a communication system using a dynamic Time Division Duplex (TDD) UpLink-DownLink (UL-DL) configuration is provided. The method includes receiving reconfiguration information for reconfiguration of TDD uplink and downlink from an evolved Node B (eNB), measuring interference in a first sub-frame changed from an
(Continued)

uplink sub-frame to a downlink sub-frame by the reconfiguration, and transmitting information on interference measured in only the first sub-frame to the eNB in an uplink sub-frame according to a predetermined timing.

16 Claims, 12 Drawing Sheets

(30) Foreign Application Priority Data

| | | |
|---|---|---|
| Jun. 19, 2013 | (KR) | 10-2013-0070464 |
| Jul. 25, 2013 | (KR) | 10-2013-0088081 |
| Sep. 27, 2013 | (KR) | 10-2013-0115224 |

(51) Int. Cl.

| | |
|---|---|
| *H04W 72/04* | (2009.01) |
| *H04W 24/08* | (2009.01) |
| *H04B 7/26* | (2006.01) |
| *H04L 1/18* | (2006.01) |
| *H04L 5/14* | (2006.01) |

(52) U.S. Cl.
CPC .......... *H04L 1/1887* (2013.01); *H04L 5/0028* (2013.01); *H04L 5/0057* (2013.01); *H04L 5/14* (2013.01); *H04L 5/1469* (2013.01); *H04W 24/08* (2013.01); *H04W 72/042* (2013.01)

(56) References Cited

U.S. PATENT DOCUMENTS

| | | |
|---|---|---|
| 2012/0113875 A1 | 5/2012 | Alanara et al. |
| 2012/0176947 A1 | 7/2012 | Xi et al. |
| 2012/0263057 A1 | 10/2012 | Choi et al. |
| 2013/0044621 A1 | 2/2013 | Jung et al. |
| 2013/0272169 A1* | 10/2013 | Wang ................ H04W 72/0446 370/280 |
| 2014/0160967 A1* | 6/2014 | Gao ...................... H04W 24/10 370/252 |
| 2014/0192771 A1 | 7/2014 | Jung et al. |
| 2014/0247801 A1* | 9/2014 | Oizumi ................. H04L 5/0037 370/329 |
| 2014/0286291 A1 | 9/2014 | Einhaus |
| 2014/0313925 A1 | 10/2014 | Seo et al. |
| 2014/0369221 A1* | 12/2014 | Fu .......................... H04L 5/006 370/252 |
| 2015/0358998 A1* | 12/2015 | Golitschek Edler Von Elbwart . H04W 48/16 370/280 |
| 2015/0373550 A1* | 12/2015 | Hong ................ H04W 72/0446 370/254 |

FOREIGN PATENT DOCUMENTS

| | | |
|---|---|---|
| CN | 101741693 A | 6/2010 |
| WO | 2012-167431 A2 | 12/2012 |

OTHER PUBLICATIONS

Nokia Corporation et al., Evaluation results for LTE TDD eIMTA in multiple-outdoor Pico cell scenario, R1-121300, 3GPP TSG-RAN WG1 Meeting #68bis, Jeju, Korea, Mar. 26-30, 2012.

* cited by examiner

METHOD AND APPARATUS FOR TRANSMITTING CHANNEL STATE INFORMATION IN WIRELESS COMMUNICATION SYSTEM

CROSS-REFERENCE TO RELATED APPLICATION(S)

This application is a continuation application of prior application Ser. No. 14/243,241, filed on Apr. 2, 2014, which issued as U.S. Pat. No. 9,450,737 on Sep. 20, 2016, and claims the benefit under 35 U.S.C. §119(a) of a Korean patent application filed on Apr. 3, 2013 in the Korean Intellectual Property Office and assigned Serial number 10-2013-0036550, a Korean patent application filed on May 2, 2013 in the Korean Intellectual Property Office and assigned Serial number 10-2013-0049184, a Korean patent application filed on Jun. 19, 2013 in the Korean Intellectual Property Office and assigned Serial number 10-2013-0070464, a Korean patent application filed on Jul. 25, 2013 in the Korean Intellectual Property Office and assigned Serial number 10-2013-0088081, and a Korean patent application filed on Sep. 27, 2013 in the Korean Intellectual Property Office and assigned Serial number 10-2013-0115224, the entire disclosures of each of which is hereby incorporated by reference.

TECHNICAL FIELD

The present disclosure relates to a cellular wireless communication system. More particularly, the present disclosure relates to a method and an apparatus for transmitting channel information in a cellular wireless communication base station.

BACKGROUND

In recent mobile communication systems, an Orthogonal Frequency Division Multiple Access (OFDMA) scheme and a Single Carrier-Frequency Division Multiple Access (SC-FDMA) scheme similar to the OFDMA scheme are actively researched as schemes useful for high speed data transmission in a wireless channel. In the multiple access schemes as described above, time-frequency resources for carrying data or control information are allocated and operated in a manner to prevent overlapping of the resources, to establish the orthogonality between users, so as to identify data or control information of each user.

In a cellular wireless communication system, it is an important factor to support a scalable bandwidth in order to provide a high speed wireless data service.

For example, a Long Term Evolution (LTE) system can have various bandwidths, such as 20/15/10/5/3/1.4 MHz. Service providers can select among the bandwidths described above to provide a service, and there are various User Equipment (UEs), ranging from UEs capable of supporting a maximum of a bandwidth of 20 MHz to UEs capable of supporting only a minimum bandwidth of 1.4 MHz. In addition, an LTE-Advanced (LTE-A) system targeted at providing a service of an IMT-Advanced requirement level can provide a broadband service up to a maximum of 100 MHz bandwidth through LTE Carrier Aggregation (CA).

For high speed data transmission, an LTE-A system employs a broader band than an LTE system. Since the backward compatibility for LTE UEs is also important, the LTE UEs should also be capable of accessing the LTE-A system to use a service provided by the LTE-A system. To this end, in the LTE-A system, the entire system band is divided into sub-bands or Component Carriers (CCs), also referred also to as cells, having a bandwidth that can be transmitted or received by an LTE UE. Predetermined CCs are combined and data is then generated and transmitted through each CC. Accordingly, the transmission/reception process of an LTE system according to the related art can be used for each CC to support a high speed data transmission of the LTE-A system. Each CC or cell can be classified into a primary cell or a secondary cell according to its use or importance in view of a UE. In view of a UE, there is only one primary cell and the other cells except for the primary cell correspond to secondary cells. In the LTE-A system according to the related art, an uplink control channel is allowed to be transmitted in only the primary cell while an uplink data channel is allowed to be transmitted in both the primary cell and a secondary cell.

Scheduling information for data transmitted through each CC is notified as Downlink Control Information (DCI) to a UE. DCI defines various formats and applies and operates a DCI format determined according to whether the scheduling information is scheduling information for uplink data or scheduling information for downlink data, whether a spatial multiplexing using multiple antennas is applied, whether the DCI is a DCI for power control, and the like. For example, DCI format #1, which corresponds to control information for downlink data to which the Multiple Input Multiple Output (MIMO) antenna is not applied, is configured by control information as follows.

Resource allocation type 0/1 flag: this control information notifies of whether the resource allocation scheme is type 0 or type 1. Type 0 applies a bitmap scheme and allocates resources by the unit of Resource Block Groups (RBGs). In an LTE or LTE-A system, a basic unit of scheduling is a Resource Block (RB) expressed by time and frequency domain resources and an RBG is configured by a plurality of RBs and serves as a basic unit of scheduling in type 0. Type 1 allows allocation of a particular RB in an RBG.

Resource Block assignment: This control information notifies of an RB allocated to data transmission. An expressed resource is determined according to the system bandwidth and resource allocation scheme.

Modulation and Coding Scheme (MCS): This control information notifies of a modulation scheme and a coding rate used in data transmission.

HARQ process number: This control information notifies of a process number of HARQ.

New data indicator: This control information indicates HARQ initial transmission or retransmission.

Redundancy version: This control information notifies of a redundancy version of HARQ.

TPC command for PUCCH: This control information notifies of a power control command for a Physical Uplink Control CHannel (PUCCH) which is an uplink control channel.

The DCI as described above is then transmitted through a Physical Downlink Control CHannel (PUDCH) which is a downlink physical control channel, after being channel-coded and modulated.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting channel information necessary for scheduling of downlink data by a pico evolved Node B (eNB) when the pico eNB uses a sub-frame, which is used as an uplink sub-frame by a macro eNB, for downlink transmission in a Time Division Duplex (TDD) communication system supporting a flexible sub-frame or dynamic TDD UpLink-DownLink (UL-DL) reconfiguration.

However, in a Time Division Duplex (TDD) communication system, a pico evolved Node B (eNB) may use a sub-frame, which is used as an uplink sub-frame by a macro eNB, for downlink transmission through a flexible sub-frame or dynamic TDD UL-DL reconfiguration. In this event, the macro eNB can control uplink transmission of a macro User Equipment (UE) in the uplink sub-frame in order to control interference applied to a UE (a pico eNB UE) receiving service from a pico eNB by a UE (a macro eNB UE) receiving service from a macro eNB. The pico eNB may require channel information from the pico eNB UE in order to schedule downlink data for the pico eNB UE in a sub-frame which the macro eNB uses as an uplink sub-frame.

Aspects of the present disclosure have been made to solve the problems as described above, and an aspect of the present disclosure is to provide a method and an apparatus for transmitting channel information necessary for scheduling of downlink data by a pico eNB when the pico eNB uses a sub-frame, which is used as an uplink sub-frame by a macro eNB, for downlink transmission in a TDD communication system supporting a flexible sub-frame or dynamic TDD UL-DL reconfiguration.

In accordance with an aspect of the present disclosure, a method of transmitting channel information by a UE in a communication system using a dynamic Time Division Duplex (TDD) UpLink-DownLink (UL-DL) configuration is provided. The method includes receiving reconfiguration information for reconfiguration of TDD uplink and downlink from an evolved Node B (eNB), measuring interference in a first sub-frame changed from an uplink sub-frame to a downlink sub-frame by the reconfiguration, and transmitting information on interference measured in only the first sub-frame to the eNB in an uplink sub-frame according to a predetermined timing.

In accordance with another aspect of the present disclosure, a method of receiving channel information by an eNB in a communication system using a dynamic TDD UL-DL configuration is provided. The method includes transmitting reconfiguration information for reconfiguration of TDD uplink and downlink to a UE, transmitting uplink data scheduling information including a request for channel information of the UE to the UE, and receiving information on interference measured in only a first sub-frame changed from an uplink sub-frame to a downlink sub-frame by the reconfiguration from the UE in an uplink sub-frame according to a predetermined timing.

In accordance with another aspect of the present disclosure, a UE transmitting channel information in a communication system using a dynamic TDD UL-DL configuration is provided. The UE includes a transmission/reception unit configured to transmit and receive a signal to and from an eNB, and a controller configured to receive reconfiguration information for reconfiguration of TDD uplink and downlink from the eNB, to measure interference in a first sub-frame changed from an uplink sub-frame to a downlink sub-frame by the reconfiguration, and to transmit information on interference measured in only the first sub-frame to the eNB in an uplink sub-frame according to a predetermined timing.

In accordance with another aspect of the present disclosure, an eNB requesting channel information in a communication system using a dynamic TDD UL-DL configuration is provided. The eNB includes a transmission/reception unit configured to transmit and receive a signal to and from a UE, and a controller configured to control to transmit reconfiguration information for reconfiguration of TDD uplink and downlink to the UE, to transmit uplink data scheduling information including a request for channel information of the UE to the UE, and to receive information on interference measured in only a first sub-frame changed from an uplink sub-frame to a downlink sub-frame by the reconfiguration from the UE in an uplink sub-frame according to a predetermined timing.

In accordance with another aspect of the present disclosure, when a pico eNB supporting dynamic TDD UL-DL reconfiguration or flexible sub-frame uses an uplink sub-frame in downlink transmission, the pico eNB can request a pico eNB UE to transmit downlink channel information, which the pico eNB can refer to when scheduling downlink data to the pico eNB UE, and the pico eNB UE can transmit the downlink channel information to the pico eNB at a predetermined timing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
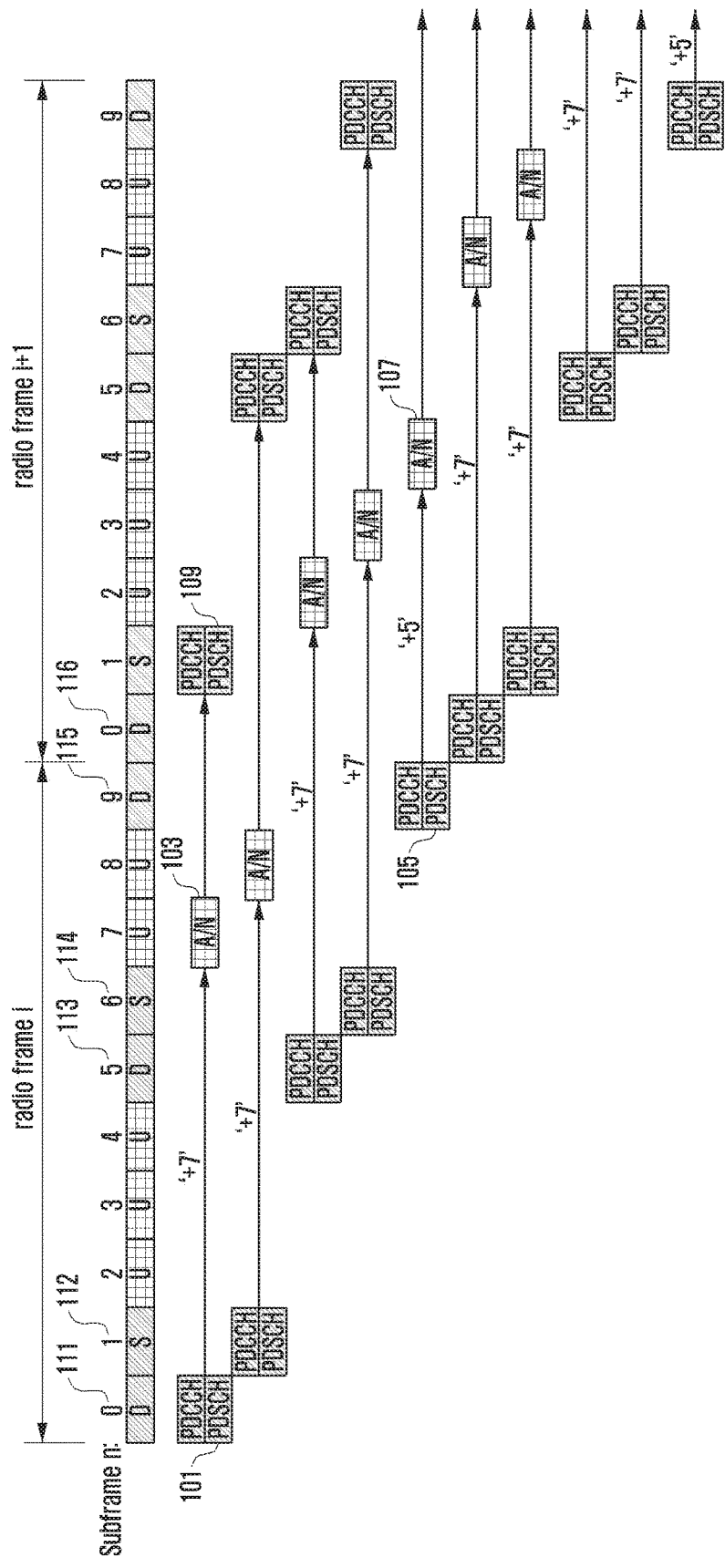
FIG. 1 illustrates an example of operation of sub-frames in a typical TDD frame according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following detailed description of various embodiments of the present disclosure is based on a Time Division Duplex (TDD) system as a main subject. However, the subject matter of the present disclosure is applicable to other communication systems having similar technical backgrounds and channel formation with small variations without largely departing from the scope of the present disclosure, and the variations may be made by determination of those skilled in the art to which the present disclosure pertains.

In general, a TDD communication system uses a common frequency for the downlink and the uplink but distinguishes transmission/reception of an uplink signal and a downlink signal in the time domain. The Long Term Evolution (LTE) TDD distinguishes between transmission of an uplink signal and transmission of a downlink signal for each sub-frame. In the LTE TDD, according to traffic loads of the uplink and the downlink, sub-frames for the uplink and the downlink can be uniformly distributed and operated in the time domain, more sub-frames can be allocated to and operated in the downlink, or more sub-frames can be allocated to and operated in the uplink. In the LTE, each sub-frame has a length of 1 ms and 10 sub-frames configure one radio frame.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 shows a TDD UpLink-DownLink configuration (TDD UL-DL configuration) defined in the LTE. In Table 1, "D" indicates a sub-frame configured for downlink transmission, "U" indicates a sub-frame configured for uplink transmission, and "S" indicates a special sub-frame configured by a Downlink Pilot Time Slot (DwPTS), a Guard Period (GP), and an Uplink Pilot Time Slot (UpPTS). The DwPTS allows downlink control information transmission like a typical sub-frame and allows downlink data transmission also when the DwPTS is sufficiently long according to the configuration state of the special sub-frame. The GP is an interval for accepting transition from the downlink to the uplink and has a length determined by a network configuration, and the like. The UpPTS is used for transmission of a Sounding Reference Signal (SRS) necessary for estimating an uplink channel state by a UE or transmission of a Random Access CHannel (RACH) necessary for random access by a UE.

For example, in the case of TDD UL-DL configuration #6, downlink data and control information can be transmitted in sub-frames #0, #5, and #9 and uplink data and control information can be transmitted in sub-frames #2, #3, #4, #7, and #8. In sub-frames #1 and #6, which correspond to special sub-frames, downlink control information can be transmitted, downlink data can be transmitted in some cases, and an SRS and an RACH can be transmitted in the uplink.

In a TDD system, since transmission of a downlink signal or an uplink signal is allowed only in a particular time interval, it may be necessary to define specific timing relations between uplink/downlink physical channels related to each other, such as a control channel for data scheduling, a scheduled data channel, and an HARQ ACK/NACK channel corresponding to the data channel.

In an LTE TDD system, an uplink/downlink timing relation between a Physical Downlink Shared CHannel (PDSCH), which is a physical channel for downlink data transmission, and a Physical Uplink Shared CHannel (PUSCH) or a Physical Uplink Control CHannel (PUCCH), which is a physical channel for transmission of an uplink HARQ ACK/NACK corresponding to the PDSCH, is as follows.

When receiving a PDSCH transmitted in sub-frame (n−k) from an eNB, a UE transmits an uplink HARQ ACK/NACK for the PDSCH in uplink sub-frame n. In this event, k indicates an element of a set K, which is defined by Table 2 below.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 3 shows rearrangement of sub-frames in which uplink HARQ ACK/NACKs corresponding to PDSCHs are transmitted when the PDSCHs are transmitted in respective Downlink sub-frames (D) or Special sub-frames (S) n in each TDD UL-DL configuration based on the definition in Table 2.

TABLE 3

| Subframe n UL-DL Configuration | 0 | 1 | 2 | 3 | 4 | 5 | 6 | 7 | 8 | 9 |
|---|---|---|---|---|---|---|---|---|---|---|
| 0 | D 4 | S 6 | U | U | U | D 4 | S 6 | U | U | U |
| 1 | D 7 | S 6 | U | U | D 4 | D 7 | S 6 | U | U | D 4 |
| 2 | D 7 | S 6 | U | D 4 | D 8 | D 7 | S 6 | U | D 4 | D 8 |
| 3 | D 4 | S 11 | U | U | U | D 7 | D 6 | D 6 | D 5 | D 5 |
| 4 | D 12 | S 11 | U | U | D 8 | D 7 | D 7 | D 6 | D 5 | D 4 |
| 5 | D 12 | S 11 | U | D 9 | D 8 | D 7 | D 6 | D 5 | D 4 | D 13 |
| 6 | D 7 | S 7 | U | U | U | D 7 | S 7 | U | U | D 5 |

FIG. 1 illustrates an example of operation of sub-frames in a typical TDD frame according to an embodiment of the present disclosure.

Referring to FIG. 1, Table 3 will be described with reference to FIG. 1. FIG. 1 shows an example of sub-frames in which uplink HARQ ACK/NACKs corresponding to PDSCHs are transmitted when the PDSCHs are transmitted in respective downlink sub-frames or special sub-frames in TDD UL-DL configuration #6 of Table 3 based on the definition in Table 3.

For example, an uplink HARQ ACK/NACK 103 corresponding to a PDSCH 101 transmitted in sub-frame #0 of radio frame i by an eNB is transmitted in sub-frame #7 of radio frame i by a UE. In this event, Downlink Control Information (DCI) including scheduling information on the PDSCH 101 is transmitted through a PDCCH in the same sub-frame as the sub-frame in which the PDSCH is transmitted. As another example, an uplink HARQ ACK/NACK 107 corresponding to a PDSCH 105 transmitted in sub-frame #9 of radio frame i by an eNB is transmitted in sub-frame #4 of radio frame (i+1) by a UE. In the same manner, DCI including scheduling information on the PDSCH 105 is transmitted through a PDCCH in the same sub-frame as the sub-frame in which the PDSCH is transmitted.

In an LTE system, a downlink HARQ employs an asynchronous HARQ scheme in which a data retransmission time point is not fixed. When an eNB has received an HARQ NACK fed back from a UE in response to an initially transmitted HARQ data, the eNB can freely determine a next HARQ data retransmission time point through a scheduling operation. For the HARQ operation, the UE buffers HARQ data, which has been determined as erroneous as a result of decoding of received data, and then combines the buffered HARQ data with next HARQ retransmission data. In this event, in order to maintain the reception buffer capacity of the UE, the maximum number of HARQ processes for each TDD UL-DL configuration is defined as shown in Table 4 below. One HARQ process is mapped to one sub-frame in the time domain.

TABLE 4

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to the example shown in FIG. 1, the UE decodes a PDSCH 101 transmitted in sub-frame #0 of radio frame i by an eNB, and transmits an HARQ NACK 103 in sub-frame #7 of radio frame i when the UE determines that the PDSCH has an error. Upon receiving the HARQ NACK, the eNB configures retransmission data for the PDSCH 101 by PDSCH 109 and transmits the configured PDSCH 109 together with a PDCCH. The example illustrated in FIG. 1 shows transmission of the retransmission data in sub-frame #1 of radio frame (i+1) by reflecting the point that the maximum number of downlink HARQ processes of TDD DL-UL configuration #6 is 6 according to the definition in Table 4 described above. A total of six downlink HARQ processes 111, 112, 113, 114, 115, and 116 exist between the initially transmitted PDSCH 101 and the retransmitted PDSCH 109.

In an LTE system, the uplink HARQ employs a synchronous HARQ scheme in which a data retransmission time point is fixed, differently from the downlink HARQ. In other words, the uplink/downlink timing relation of a PUSCH, which is a physical channel for uplink data transmission, a PDCCH, which is a downlink control channel preceding the PUSCH, and a Physical Hybrid Indicator CHannel (PHICH), which is a physical channel for transmission of a downlink HARQ ACK/NACK corresponding to the PUSCH, is fixed by the rule as follows.

When receiving a PHICH for transmission of a downlink HARQ ACK/NACK or a PDCCH including uplink scheduling control information transmitted from an eNB in sub-frame n, a UE transmits uplink data corresponding to the control information in sub-frame (n+k) through a PUSCH. In this event, k is defined by Table 5 below.

TABLE 5

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 |   | 4 | 6 |   |   |   | 4 | 6 |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 |   | 7 | 7 |   |   |   | 7 | 7 |   | 5 |

When the UE receives a PHICH carrying a downlink HARQ ACK/NACK from the eNB in sub-frame i, the PHICH corresponds to a PUSCH transmitted in sub-frame (i−k) by the UE. In this event, k is defined by Table 6 below.

TABLE 6

| TDD UL/DL Configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 |   | 7 | 4 |   |   |   | 7 | 4 |   |   |
| 1 |   | 4 |   |   | 6 |   | 4 |   |   | 6 |
| 2 |   |   |   | 6 |   |   |   |   | 6 |   |
| 3 | 6 |   |   |   |   |   |   | 6 | 6 |   |
| 4 |   |   |   |   |   |   |   | 6 | 6 |   |
| 5 |   |   |   |   |   |   |   | 6 |   |   |
| 6 |   | 6 | 4 |   |   |   | 7 | 4 |   | 6 |

Figure 2:
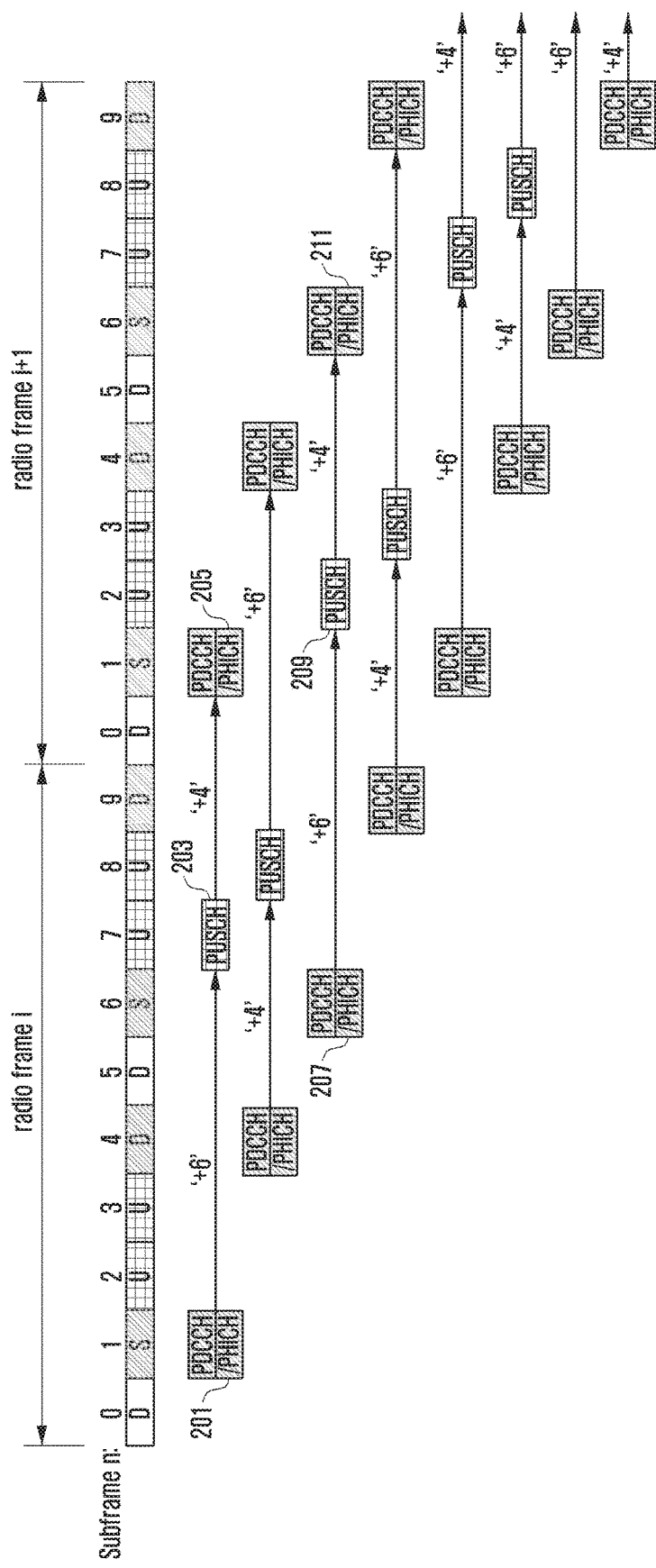
FIG. 2 illustrates another example of operation of sub-frames in a typical TDD frame according to an embodiment of the present disclosure.

FIG. 2 illustrates another example of operation of sub-frames in a typical TDD frame according to an embodiment of the present disclosure.

Referring to FIG. 2, an example is illustrated of sub-frames in which uplink PUSCHs corresponding to PDCCHs or PHICHs are transmitted and sub-frames in which PHICHs corresponding to the PUSCHs are transmitted, when the PDCCHs or PHICHs are transmitted in respective downlink sub-frames or special sub-frames in the case of TDD UL-DL configuration #1, based on the definition in Table 5 and Table 6 described above.

For example, an uplink PUSCH 203 corresponding to a PDCCH or PHICH 201 transmitted in sub-frame #1 of radio frame i by an eNB is transmitted in sub-frame #7 of radio frame i by a UE. The eNB transmits a PHICH 205 corresponding to the PUSCH to the UE in sub-frame #1 of radio frame (i+1). As another example, an uplink PUSCH 209 corresponding to a PDCCH or PHICH 207 transmitted in sub-frame #6 of radio frame i by the eNB is transmitted in sub-frame #2 of radio frame i by the UE. The eNB transmits a PHICH 211 corresponding to the PUSCH to the UE in sub-frame #6 of radio frame (i+1).

In an LTE TDD system, in relation to the PUSCH transmission, downlink transmission of a PDCCH or PHICH corresponding to the PUSCH is limited in a particular downlink sub-frame, so as to guarantee a minimum transmission/reception processing time of an eNB and a UE. For example, in the case of TDD UL-DL configuration #1 in FIG. 2, a PDCCH for scheduling the PUSCH or a PHICH corresponding to the PUSCH is not transmitted in the downlink in sub-frames #0 and #5.

Generally, in a TDD system, after a TDD UL-DL configuration is determined, the number of sub-frames for uplink transmission and the number of sub-frames for downlink transmission are determined. Accordingly, it is impossible to actively cope with a case in which a particular eNB at a particular time point requires a larger data capacity for the downlink transmission than that for the uplink transmission.

As a result, instead of changing the TDD UL-DL configuration of the entire system, it is possible to consider a dynamic TDD UL-DL reconfiguration or flexible sub-frame scheme in which a particular eNB can perform a dynamic change according to the required data capacity of the uplink and the downlink.

The dynamic TDD UL-DL reconfiguration refers to a scheme of transmitting another TDD UL-DL reconfiguration other than a currently configured TDD UL-DL reconfiguration to all UEs or a particular UE within an eNB through one method selected from system information, Radio Resource Control (RRC) signaling, Medium Access Control (MAC) signaling, and Physical layer (PHY) signaling.

In the flexible sub-frame scheme, in order not to influence a guard time that should exist between a downlink sub-frame and an uplink sub-frame, a flexible sub-frame may be allocated to another uplink sub-frame consecutively adjacent on the time axis, to the uplink sub-frame always existing before the downlink sub-frame. In other words, the particular uplink sub-frame can be used for downlink transmission.

Figure 3:
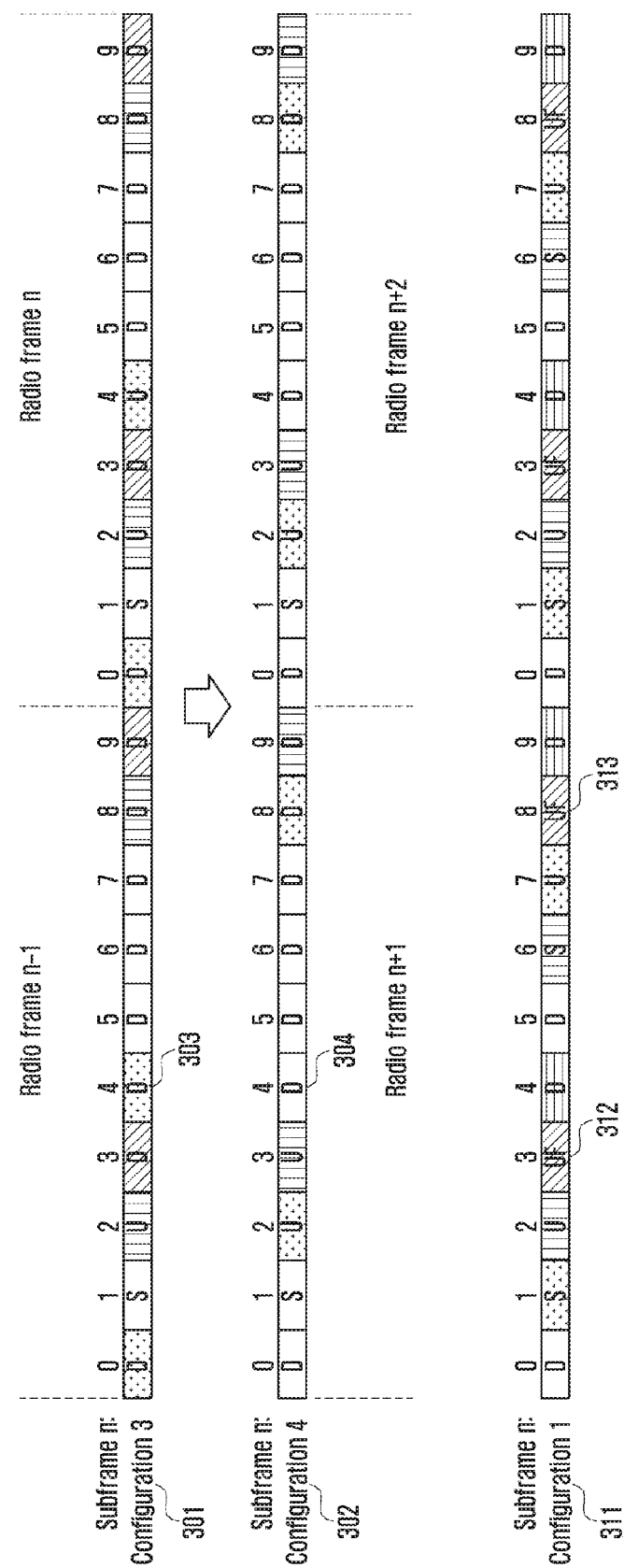
FIG. 3 illustrates an example of an operation according to a flexible sub-frame or dynamic Time Division Duplex (TDD) UpLink-DownLink (UL-DL) reconfiguration in a communication system according to an embodiment of the present disclosure.

FIG. 3 illustrates an example of an operation according to a flexible sub-frame or dynamic TDD UL-DL reconfiguration in a communication system according to an embodiment of the present disclosure.

Referring to FIG. 3, reference numerals 301 to 304 correspond to an example to which dynamic TDD UL-DL reconfiguration is applied, and reference numerals 311 to 313 correspond to an example in which a flexible sub-frame is applied to TDD UL-DL configuration #1.

Referring to reference numerals 301 to 304, one radio frame includes a plurality of sub-frames, 10 sub-frames in the present embodiment, wherein reference numeral 301 corresponds to radio frames having indexes of (n−1) and n and reference numeral 302 corresponds to radio frames having indexes of (n+1) and (n+2).

Configuration #3 301 is configured for radio frames having indexes of (n−1) and n as the TDD UL-DL configuration within the eNB. According to the determination of the eNB based on the required data capacity of the uplink and the downlink, the TDD UL-DL configuration may be reconfigured into configuration #4 302 from the radio frame having an index of (n+1). In this event, the reconfiguration information can be transmitted through one of system information, higher layer signaling (e.g. RRC signaling), MAC signaling, and physical layer signaling.

Sub-frame #4, which is an uplink sub-frame 303 in TDD UL-DL configuration #3 301, changes into a downlink sub-frame 304 from a radio frame having an index of n according to reconfiguration into TDD UL-DL configuration #4. Accordingly, a macro eNB uses sub-frame #4 for uplink transmission in a state without change in the TDD UL-DL configuration and a pico eNB can use sub-frame #4 for downlink transmission through TDD UL-DL reconfiguration.

The TDD UL-DL configuration in the eNB is configuration #1 311. When two flexible sub-frames are operated in one radio frame of TDD UL-DL configuration #1, the two flexible sub-frames may be configured by sub-frames 312 and 313. Among the uplink sub-frames, sub-frames 312 and 313 adjacent to downlink sub-frames are operated as flexible sub-frames. Sub-frames #3 and #8 may be operated as flexible sub-frames. Each of sub-frame #3 312 and sub-frame #8 313 described above is marked by UF implying an Uplink Flexible sub-frame which can be used for downlink transmission.

According to various embodiments, an eNB can notify a UE of an uplink sub-frame to be operated as a flexible sub-frame, through separate information or signaling. Otherwise, without separate information or signaling from an eNB, a UE may identify an uplink sub-frame operated as a flexible sub-frame by itself. Sub-frames 312 and 313, which are uplink sub-frames in TDD UL-DL configuration #1 311, are configured as flexible sub-frames and used for downlink transmission by a pico eNB. Accordingly, a macro eNB uses sub-frame #3 for uplink transmission since the macro eNB uses TDD UL-DL configuration #1 without change, and a pico eNB can use sub-frame #3 for downlink transmission through flexible sub-frame configuration.

Figure 4:
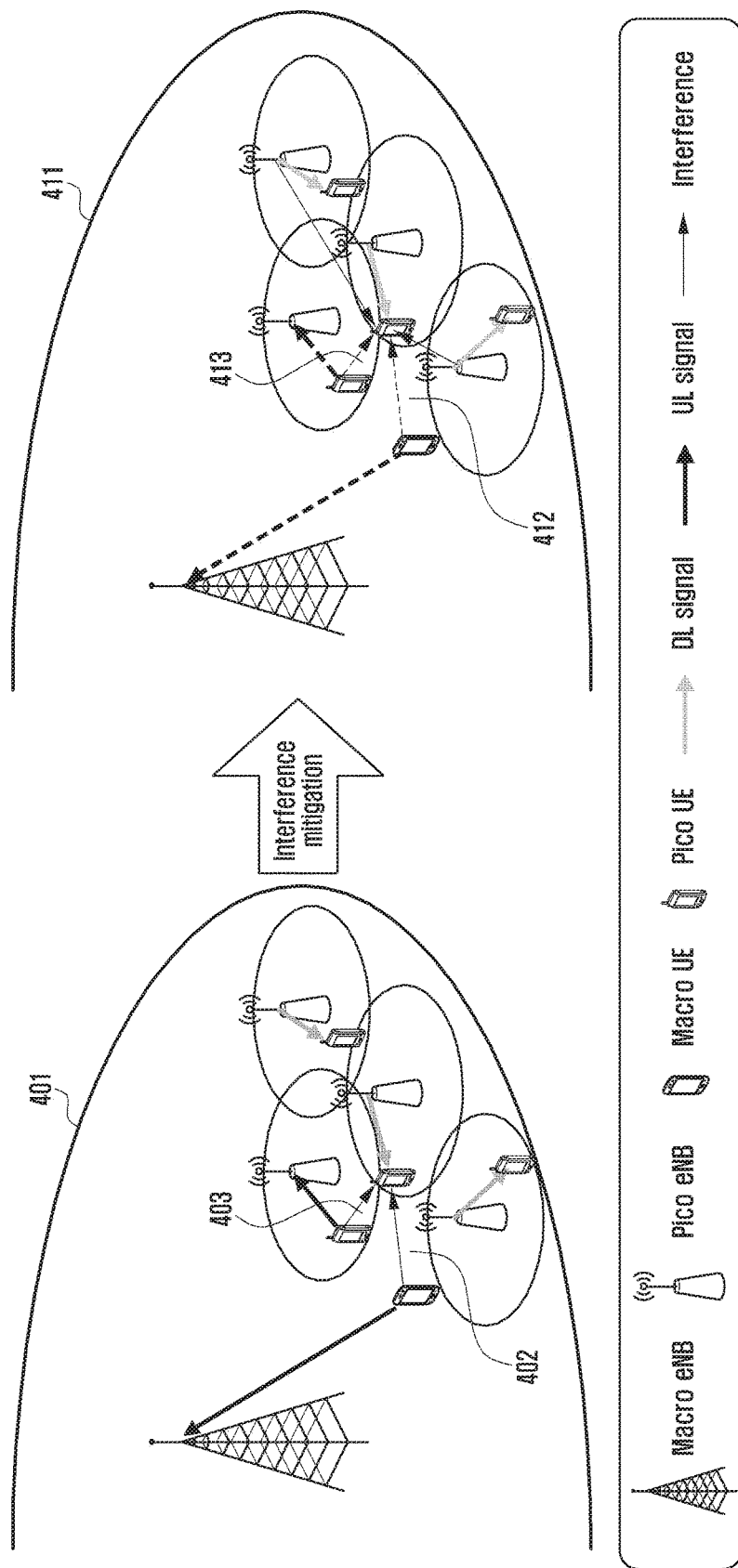
FIG. 4 illustrates a communication system according to an embodiment of the present disclosure.

FIG. 4 illustrates a concept of a communication system according to an embodiment of the present disclosure.

Referring to FIG. 4, a state is illustrated in which a particular eNB uses uplink sub-frame for downlink transmission through a flexible sub-frame or TDD UL-DL reconfiguration in a TDD system including a plurality of eNBs operating based on the same TDD UL-DL configuration.

Referring to the part indicated by reference numeral 401, when a macro eNB and pico eNBs use a corresponding uplink sub-frame for uplink transmission without change and adjacently located pico eNBs use the corresponding uplink sub-frame for downlink transmission through a flexible sub-frame or dynamic TDD UL-DL reconfiguration, pico eNB UEs receiving the downlink transmission from the adjacently located pico eNBs receive interference from other macro eNB UEs or other pico eNB UEs, which are located adjacent to the pico eNB UEs receiving the downlink transmission and performing the uplink transmission to the macro eNB and the pico eNBs (see 402 and 403). In FIG. 4, application of interference is indicated by arrows named "interference".

Referring to the part indicated by reference numeral 411, when a particular pico eNB uses an uplink sub-frame for downlink transmission through a flexible sub-frame or dynamic TDD UL-DL reconfiguration, in order to enable a pico eNB UE to receive a downlink signal without interference, a macro eNB and pico eNBs may not schedule uplink data in the uplink sub-frame. Through this scheme, the macro eNB and the pico eNBs can prevent generation of interference to downlink data reception of a particular pico eNB UE (see 412 and 413).

Through the method described above with reference to FIG. 4, the particular pico eNB can use an uplink sub-frame for downlink transmission without interference (from a macro eNB). When the uplink sub-frame is used for downlink transmission, a channel state of the uplink sub-frame is different from a channel state of a typical downlink sub-frame. This is because all eNBs can perform downlink data transmission in a typical downlink sub-frame.

Accordingly, when a pico eNB uses an uplink sub-frame for downlink transmission, channel information which the pico eNB can refer to for scheduling of downlink data is necessary. In addition, a scheme for notifying a pico eNB of channel information by a pico eNB UE may be needed.

Figure 5:
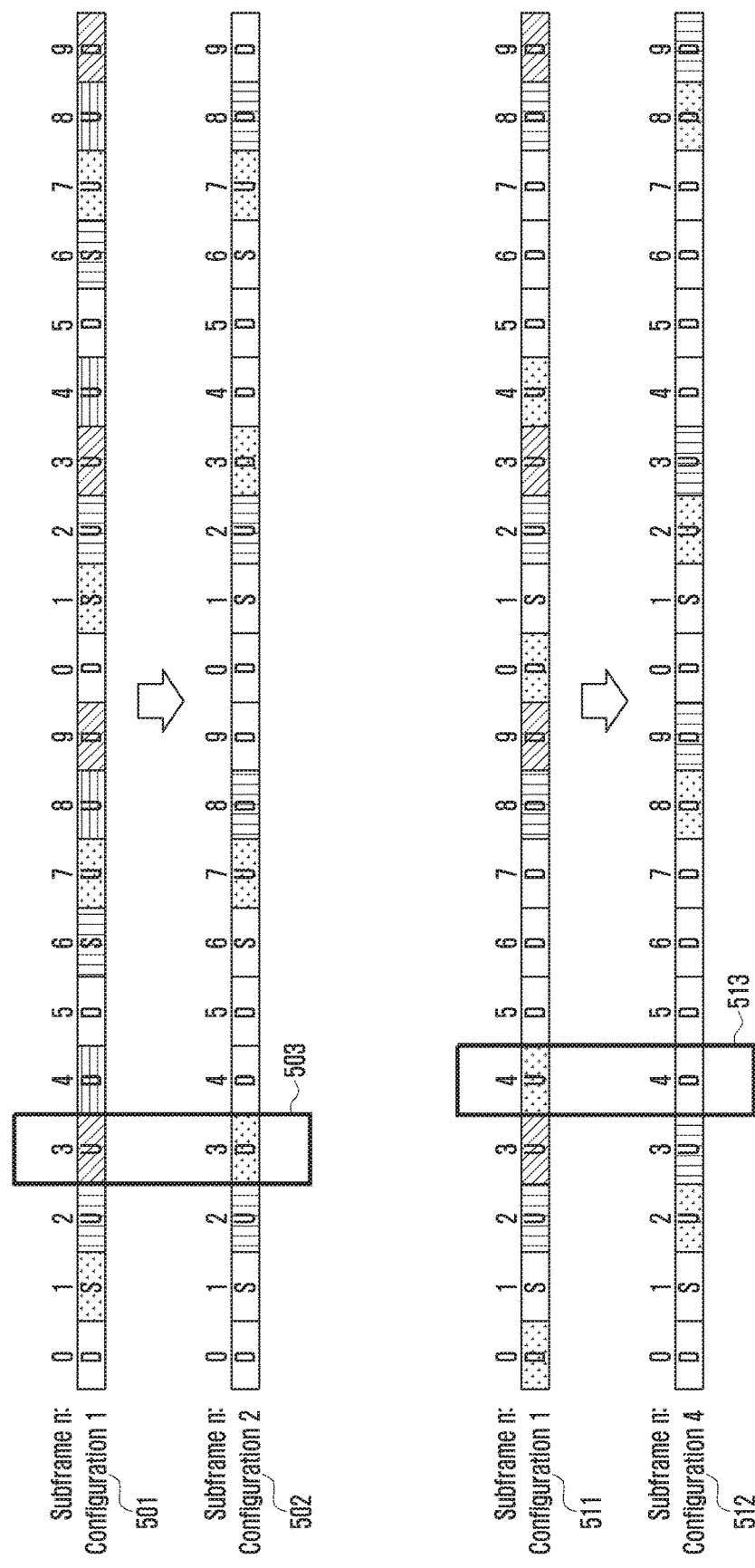
FIG. 5 illustrates an example of transmission of channel information through dynamic TDD UL-DL reconfiguration in a communication system according to an embodiment of the present disclosure.

FIG. 5 illustrates an example of transmission of channel information through dynamic TDD UL-DL reconfiguration in a communication system according to an embodiment of the present disclosure.

Referring to FIG. 5, a method is described for allowing a pico eNB UE to transmit downlink channel information which a pico eNB can refer to in scheduling of downlink data, when the pico eNB UE uses a sub-frame, which is used as an uplink sub-frame by a macro eNB, for downlink transmission through dynamic TDD UL-DL reconfiguration in a TDD system.

In the examples described herein with respect to FIG. 5, it is assumed that, when a pico eNB uses a sub-frame, used as an uplink sub-frame by a macro eNB, for downlink transmission through dynamic TDD UL-DL reconfiguration, the present disclosure does not allow uplink transmission in an adjacent macro eNB or pico eNB through interference control of a macro eNB and other pico eNBs as in FIG. 4 Further, for TDD UL-DL reconfiguration, sub-frame sets for all downlink sub-frames can be classified according to the TDD UL-DL configurations and then transmitted in advance as a higher layer signal to a UE. Accordingly, at the time of TDD UL-DL reconfiguration, all sub-frames used for downlink transmission belong to one sub-frame among two sub-frame sets (based on an assumption that two sub-frame sets exist).

As a result, the embodiment of the present disclosure described below provides a scheme by which, when adjacent pico eNBs using the sub-frame for downlink transmission exist, it is possible to detect channel information including downlink interference from the corresponding pico eNBs, i.e. a method in which a pico eNB UE measures channel information in a corresponding sub-frame and reports measured channel information to the pico eNB.

The frame structure including the parts indicated by reference numerals 501 to 503 is based on a situation in which the TDD UL-DL configuration of a pico eNB is reconfigured from #1 to #2. In each TDD UL-DL configuration, sub-frames having the same pattern configure one uplink HARQ process and sub-frames having no pattern may imply sub-frames having no uplink HARQ process.

Referring to reference numeral 503, a macro eNB or particular pico eNBs use sub-frame #3 for uplink transmission, and the pico eNB according to an embodiment of the present disclosure uses sub-frame #3 for downlink transmission.

In UL-DL configuration #2 through UL-DL reconfiguration, sub-frame #3 is a sub-frame in which an uplink HARQ process is configured. As a result, in sub-frame #3, an UpLink (UL) grant (or uplink data scheduling information) requesting channel information may be transmitted, wherein a CQI request field included in the UL grant is turned ON to request channel information in the sub-frame. In this event, the UE measures the interference in only sub-frame #3 at the time of interference measurement for generation of channel information. At the time of interference measurement, the UE does not average the interference together with interference in other sub-frames (e.g. sub-frame #3 used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame (i.e., when the UL-DL configuration is maintained), interference may be processed together in sub-frame #3 in the next radio frame. In the above description, "averaging" or "being processed together" implies inputting to one identical filter calculating the quantity of interference within a UE. A UE may include, in addition to a filter (or filters) for calculating the quantity of interference of a typical downlink sub-frame, a filter for calculating the quantity of interference in a sub-frame such as sub-frame #3 when there is signaling for another UL-DL reconfiguration.

The UE transmits uplink data including channel information in sub-frame #7 based on UL HARQ timing defined in UL-DL configuration #2. In this event, uplink data may be configured by only channel information or may be multiplexed with general data.

Next, the frame structure including the parts indicated by reference numerals 511 to 513 is based on a situation in which the TDD UL-DL configuration of a pico eNB is reconfigured from #1 to #4.

Referring to reference numeral 513, a macro eNB or particular pico eNBs use sub-frame #4 for uplink transmission, and the pico eNB according to an embodiment of the present disclosure uses sub-frame #4 for downlink transmission.

In UL-DL configuration #4 through UL-DL reconfiguration, sub-frame #4 is a sub-frame in which an uplink HARQ process does not exist. As a result, a UL grant requesting channel information cannot be transmitted in sub-frame #4. A method of requesting channel information from a UE by an eNB in a sub-frame in which a UL grant requesting the channel information cannot be transmitted described is described.

First, a method in which an eNB transmits a UL grant requesting channel information in sub-frame #4 despite that a UL grant requesting channel information cannot be transmitted in sub-frame #4 is proposed. To this end, the eNB can request the channel information in the sub-frame by turning ON the CQI request field in the UL grant. In this event, the UE measures the interference in only sub-frame #4 at the time of interference measurement for generation of channel information. At the time of interference measurement, the UE does not average the interference together with interference in other sub-frames (e.g. sub-frame #4 used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame (i.e., when the UL-DL configuration is maintained), interference can be processed together in sub-frame #4 in the next radio frame. In the above description, "averaging" or "being processed together" implies inputting to one identical filter calculating the quantity of interference within a UE. The UE may be provided with, in addition to a filter (or filters) for calculating the quantity of interference of a typical downlink sub-frame, a filter for calculating the quantity of interference in a sub-frame such as sub-frame #4 when there is signaling for another UL-DL reconfiguration.

In response to the request for channel information, uplink data including channel information is transmitted in sub-frame #2, which is the nearest uplink sub-frame appearing after four sub-frames from sub-frame #4 described above. In this event, uplink data may be configured by only channel information or may be multiplexed with general data.

Since sub-frame #2, which is the nearest uplink sub-frame, configures an uplink HARQ process together with downlink sub-frame #8, a UL grant requesting channel information can be transmitted in downlink sub-frame #8 also. When the UL grant requesting channel information in sub-frame #4 and the UL grant requesting channel information in downlink sub-frame #8 are simultaneously transmitted, the following UE operations can be taken into consideration.

First, a UE does not expect to simultaneously receive a UL grant requesting channel information in sub-frame #4 and a UL grant requesting channel information in sub-frame #8. Accordingly, the UE does not perform any transmission in uplink sub-frame #2. That is, the UE can omit (or disregard) transmission of channel information in uplink sub-frame #2.

Second, the UE first processes a UL grant requesting channel information in sub-frame #4. Accordingly, the UE transmits channel information of sub-frame #4 in uplink sub-frame #2.

Third, the UE first processes a UL grant requesting channel information in sub-frame #8. Accordingly, the UE transmits channel information of sub-frame #8 in uplink sub-frame #2.

Fourth, the UE processes both the UL grants requesting channel information in sub-frame #8 and sub-frame #4 as valid. Accordingly, the UE multiplexes and transmits channel information of sub-frame #8 and sub-frame #4 in uplink sub-frame #2. In the multiplexing, the sub-frames may be sequentially multiplexed from a sub-frame having a lowest sub-frame index. The UE may first multiplex and transmit channel information of sub-frame #4 and then multiplex and transmit channel information of sub-frame #8. However, the multiplexing based on the sub-frame indexes is just an embodiment and the present disclosure is not always limited to this embodiment. For example, the channel information may be multiplexed according to predetermined priorities.

Second, a method of transmitting a UL grant requesting channel information of sub-frame #4 in sub-frame #8 corresponding to the nearest downlink sub-frame in which an uplink HARQ process exists after sub-frame #4 is proposed. To this end, when transmitting the UL grant in sub-frame #8, the eNB can indicate multi-cluster transmission in order to distinguish from channel information for sub-frame #8. In this event, the UE measures the interference in only sub-frame #4 at the time of interference measurement for generation of channel information of sub-frame #4. At the time of interference measurement, the UE does not average the interference together with interference in other sub-frames (e.g. sub-frame #4 used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame, that is, when the UL-DL configuration is maintained, interference can be processed together in sub-frame #4 in the next radio frame. In the above description, "averaging" or "being processed together" implies inputting to one identical filter calculating the quantity of interference within a UE. The UE may be provided with, in addition to a filter (or filters) for calculating the quantity of interference of a typical downlink sub-frame, a filter for calculating the quantity of interference in a sub-frame such as sub-frame #4 when there is signaling for another UL-DL reconfiguration.

The UE transmits uplink data including channel information through multi-cluster in sub-frame #2 of the next radio frame based on UL HARQ timing defined in UL-DL configuration #2. The transmission through multi-cluster implies that one cluster among two transmissible clusters can be used for transmission of channel information of sub-frame #3. In this event, uplink data may be configured by only channel information or may be multiplexed with general data.

Third, a method in which an eNB transmits a UL grant requesting channel information in sub-frame #4 even though a UL grant requesting channel information cannot be transmitted in sub-frame #4 is proposed. To this end, the eNB requests the channel information in the sub-frame by turning ON the CQI request field in the UL grant, which is the same as in the first method described above. However, the present method is different from the first method in that, at the time of transmission of channel information by a UE in response to a request for the channel information from an eNB, uplink data including channel information is transmitted in a universal uplink sub-frame (sub-frame #2) always configured as an uplink sub-frame in all UL-DL configurations. The UE measures the interference in only sub-frame #4 at the time of interference measurement for generation of channel information. At the time of interference measurement, the UE does not average the interference together with interference in other sub-frames (e.g. sub-frame #4 used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame (i.e., when the UL-DL configuration is maintained), interference can be processed together in sub-frame #4 in the next radio frame. In the above description, "averaging" or "being processed together" implies inputting to one identical filter calculating the quantity of interference within a UE. The UE may be provided with, in addition to a filter (or filters) for calculating the quantity of interference of a typical downlink sub-frame, a filter for calculating the quantity of interference in a sub-frame such as sub-frame #4 when there is signaling for another UL-DL reconfiguration.

In this event, uplink data may be configured by only channel information or may be multiplexed with general data.

Fourth, a method in which an eNB transmits a UL grant requesting channel information in sub-frame #4 despite that a UL grant requesting channel information cannot be transmitted in sub-frame #4 is proposed. To this end, the eNB requests the channel information in the sub-frame by turning ON the CQI request field in the UL grant, which is the same as in the first and third methods described above. However, in the present embodiment, transmission of channel information of a UE in response to a request for the channel information from an eNB is performed according to DL HARQ timing defined in UL-DL configuration #4 through UL-DL reconfiguration (i.e., timing defined based on PUCCH transmission timing for a PDCCH (or PDSCH)). PDCCH (or PDSCH) transmission timing is used for transmission of a UL grant requesting channel information, and PUCCH transmission timing is used for transmission of a PUSCH by the UL grant requesting the channel information.

Accordingly, when a UL grant requesting channel information is transmitted in sub-frame #4, uplink data including channel information is transmitted in uplink sub-frame #2 according to DL HARQ timing defined in sub-frame #4 of UL-DL configuration #4, which is different from the first and third methods. In this event, uplink data may be configured by only channel information or may be multiplexed with general data. The UE measures the interference in only sub-frame #4 at the time of interference measurement for generation of the channel information.

At the time of interference measurement, the UE does not average the interference together with interference in other sub-frames (e.g. sub-frame #4 used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame, that is, when the UL-DL configuration is maintained, interference can be processed together in sub-frame #4 in the next radio frame. In the above description, "averaging" or "being processed together" implies inputting to one identical filter calculating the quantity of interference within a UE. The UE may be provided with, in addition to a filter (or filters) for calculating the quantity of interference of a typical downlink sub-frame, a filter for calculating the quantity of interference in a sub-frame such as sub-frame #4 when there is signaling for another UL-DL reconfiguration.

Figure 6A:
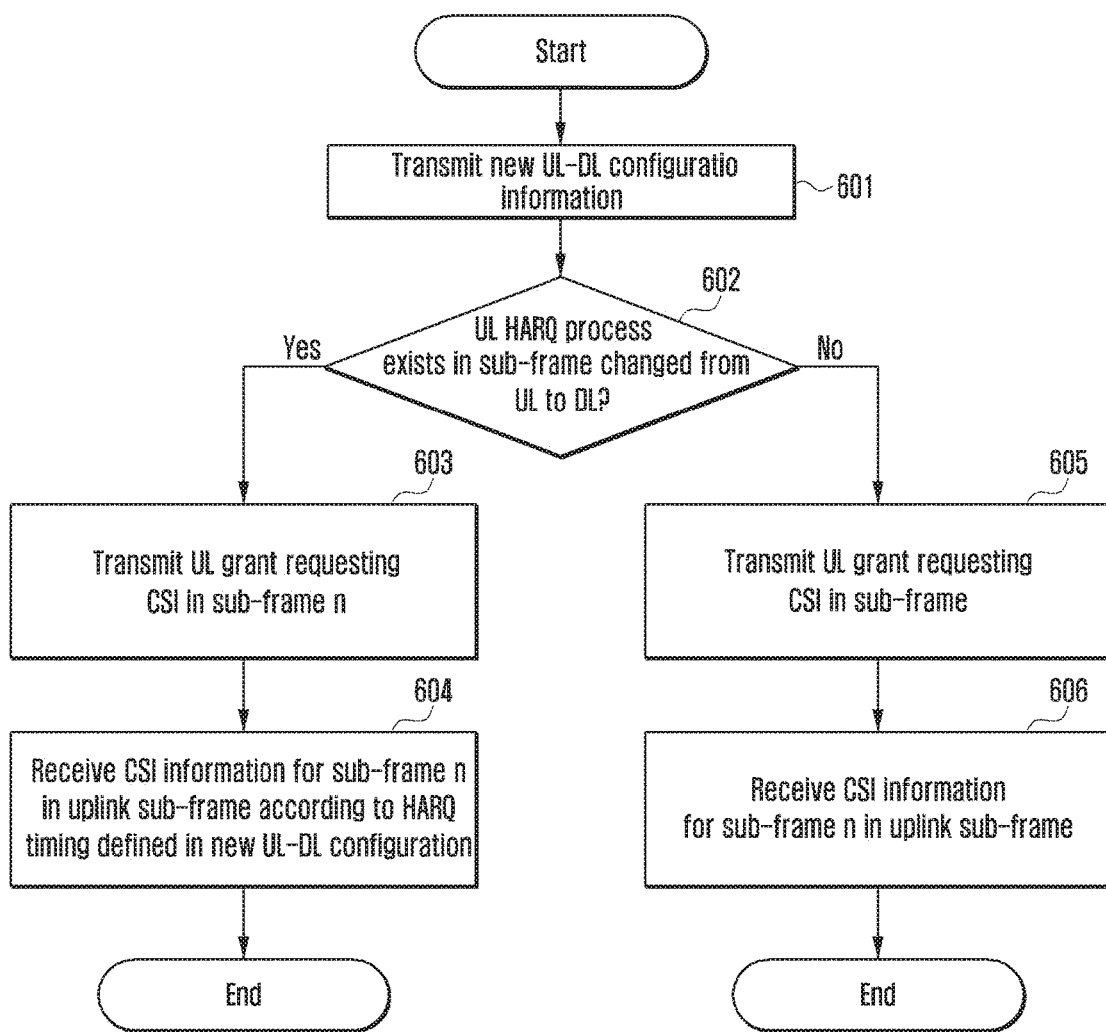
FIGS. 6A and 6B are flowcharts illustrating an evolved Node B (eNB) operation sequence and a User Equipment (UE) operation sequence for channel information transmission through dynamic TDD UL-DL reconfiguration in a communication system according to an embodiment of the present disclosure.
Figure 6B:
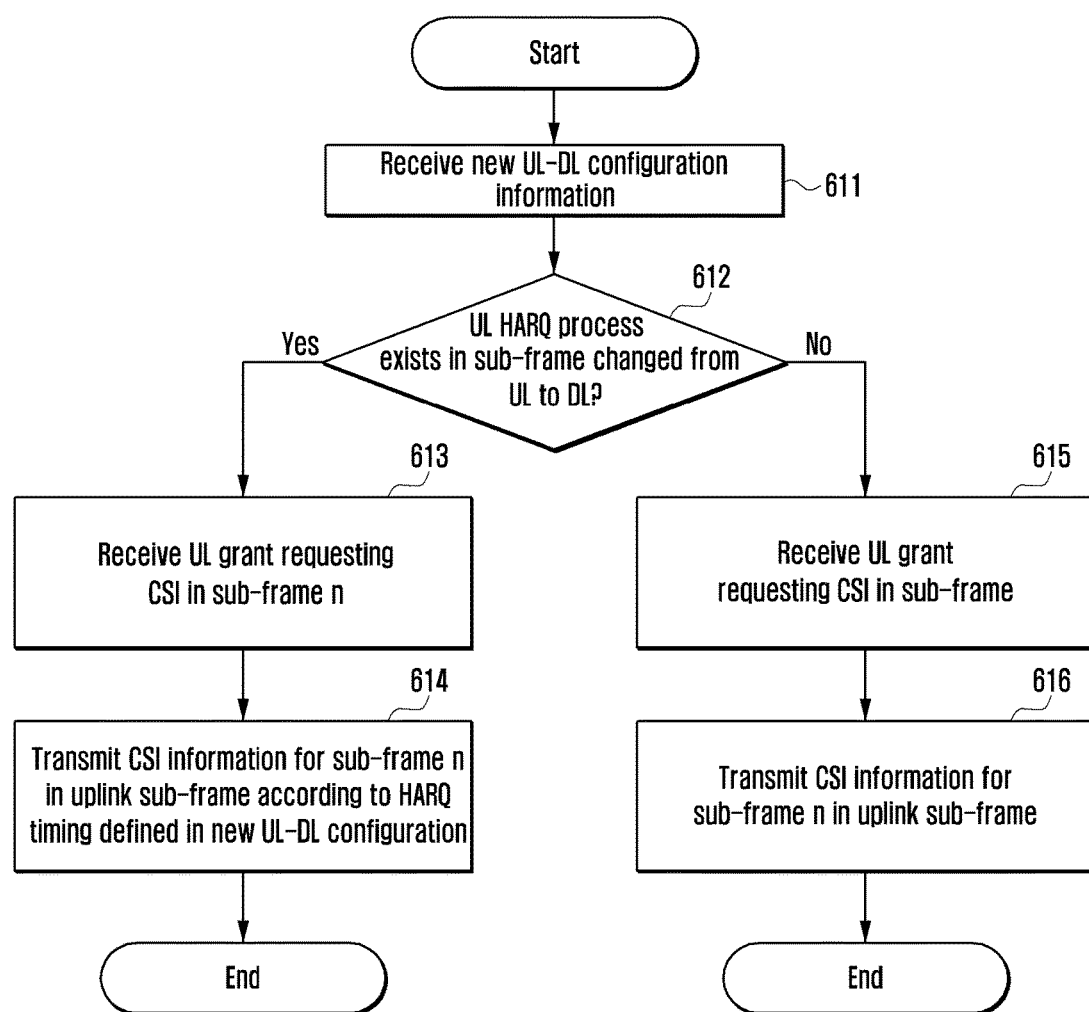

FIGS. 6A and 6B are flowcharts illustrating an eNB operation sequence and a UE operation sequence, respectively, for channel information transmission through dynamic TDD UL-DL reconfiguration in a communication system according to an embodiment of the present disclosure.

Referring to FIG. 6A, in operation 601, an eNB transmits a new TDD UL-DL configuration to a UE in order to change a current TDD UL-DL configuration. The reconfiguration information for the TDD UL-DL configuration can be transmitted to the UE through one of system information, RRC signaling, MAC signaling, and PHY signaling.

In operation 602, the eNB determines whether a UL HARQ process exists in sub-frame n, which was an uplink sub-frame before reconfiguration and is changed to a downlink sub-frame after the reconfiguration. When sub-frame n is a sub-frame in which a mapped UL HARQ process exists, the eNB transmits a UL grant requesting channel information (or uplink data scheduling information) to the UE in sub-frame n in operation 603. To this end, the eNB can request the channel information in the sub-frame by turning ON the CQI request field included in the UL grant, as described above.

In operation 604, the eNB receives channel information of the sub-frame n in an uplink sub-frame according to UL HARQ timing defined in the new UL-DL configuration.

As a result of the determination in operation 602, when sub-frame n is a sub-frame in which a UL HARQ process mapped to sub-frame n does not exist, the eNB transmits a UL grant requesting channel information of sub-frame n in a sub-frame according to the first, second, or third method proposed by the present disclosure described above with reference to FIG. 5 in operation 605.

As described above, the first and third methods include transmitting a UL grant requesting channel information in sub-frame n which does not allow transmission of the UL grant, and the second method includes transmitting a UL grant requesting channel information in the nearest downlink sub-frame in which a UL HARQ process exists after sub-frame n.

In operation 606, the eNB receives channel information of the sub-frame n in a sub-frame according to the first, second, or third method proposed by the present disclosure as described above with reference to FIG. 5.

As described above, in the first method, the eNB receives the channel information in the nearest sub-frame appearing after four sub-frames from the sub-frame in which the UL grant has been transmitted. In the second method, the eNB receives the channel information based on multi-cluster according to UL HARQ timing defined for the sub-frame in which the UL grant has been transmitted. In the third method, the eNB receives the channel information in the sub-frame in which the UL grant has been transmitted.

Referring to FIG. 6B, in operation 611, a UE receives a new TDD UL-DL configuration from an eNB in order to change a current TDD UL-DL configuration. The reconfiguration information for the TDD UL-DL configuration can be received from the UE through one of system information, RRC signaling, MAC signaling, and PHY signaling.

In operation 612, the UE determines whether a UL HARQ process exists in sub-frame n, which was an uplink sub-frame before reconfiguration and is changed to a downlink sub-frame after the reconfiguration. When sub-frame n is a sub-frame in which a mapped UL HARQ process exists, the UE receives a UL grant requesting channel information (or uplink data scheduling information) from the eNB in sub-frame n in operation 613. The UE can determine whether channel information has been requested, based on whether a CQI request field included in the UL grant has been configured to ON. The UE measures the interference in only sub-frame #3 at the time of interference measurement for generation of channel information, after or before requesting the channel information. At the time of interference measurement, the UE does not average the interference together with interference in other sub-frames (e.g. sub-frame #n used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame.

When another UL-DL reconfiguration is not performed in the next radio frame (i.e., when the UL-DL configuration is maintained), interference can be processed together in sub-frame #n in the next radio frame. In the above description, "averaging" or "being processed together" implies inputting to one identical filter calculating the quantity of interference within a UE. A UE may include, in addition to a filter (or filters) for calculating the quantity of interference of a typical downlink sub-frame, a filter for calculating the quantity of interference in a sub-frame such as sub-frame #n when there is signaling for another UL-DL reconfiguration.

In operation 614, the UE transmits channel information of the sub-frame n in an uplink sub-frame according to UL HARQ timing defined in the new UL-DL configuration.

As a result of the determination in operation 612, when sub-frame n is a sub-frame in which a mapped UL HARQ process does not exist, the UE receives a UL grant requesting channel information of sub-frame n in a sub-frame according to the first, second, or third method proposed by the present disclosure described above with reference to FIG. 5 in operation 615.

As described above, the first and third methods include receiving a UL grant requesting channel information in sub-frame n which does not allow transmission of the UL grant, and the second method includes receiving a UL grant requesting channel information in the nearest downlink sub-frame in which a UL HARQ process exists after sub-frame n.

The UE measures the interference in only sub-frame #3 at the time of interference measurement for generation of channel information, after or before requesting the channel information. At the time of interference measurement, the UE does not average the interference together with interference in other sub-frames (e.g. sub-frame #n used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame (i.e., when the UL-DL configuration is maintained), interference can be processed together in sub-frame #n in the next radio frame. In the above description, "averaging" or "being processed together" implies inputting to one identical filter calculating the quantity of interference within a UE. A UE may include, in addition to a filter (or filters) for calculating the quantity of interference of a typical downlink sub-frame, a filter for calculating the quantity of interference in a sub-frame such as sub-frame #n when there is signaling for another UL-DL reconfiguration.

In operation 616, the UE transmits channel information of sub-frame n in a sub-frame according to the first, second, or third method proposed by the present disclosure as described above with reference to FIG. 5.

As described above, in the first method, the UE transmits the channel information in the nearest sub-frame appearing after four sub-frames from the sub-frame in which the UL grant has been transmitted. In the second method, the UE transmits the channel information based on multi-cluster according to UL HARQ timing defined for the sub-frame in which the UL grant has been transmitted. In the third method, the UE transmits the channel information in the sub-frame in which the UL grant has been transmitted.

Figure 7:
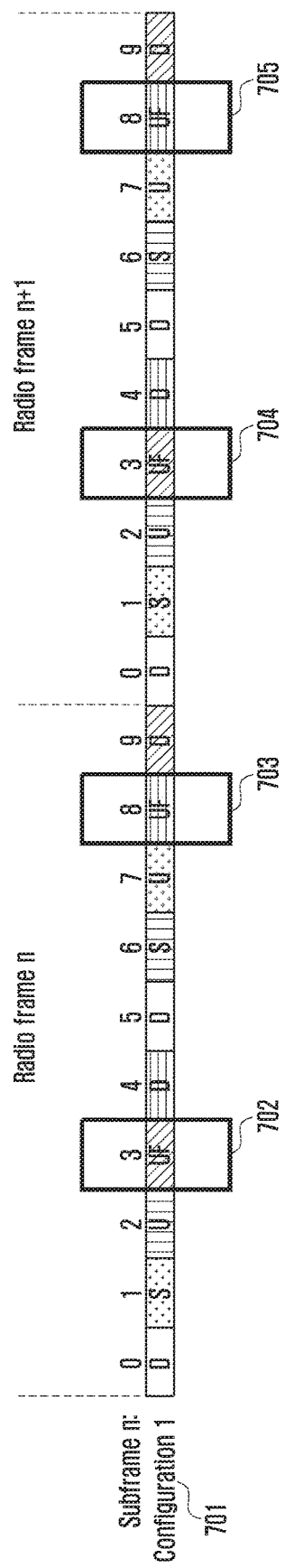
FIG. 7 illustrates an example of transmission of channel information through a flexible sub-frame in a communication system according to another embodiment of the present disclosure.

FIG. 7 illustrates an example of transmission of channel information through a flexible sub-frame in a communication system according to another embodiment of the present disclosure.

Referring to FIG. 7, a method is illustrated for allowing a pico eNB UE to transmit downlink channel information which a pico eNB can refer to in scheduling of downlink data, when the pico eNB UE uses a sub-frame, which is used as an uplink sub-frame by a macro eNB, for downlink transmission through a flexible sub-frame in a TDD system.

In the example given in FIG. 7, it is assumed that, when a pico eNB uses a sub-frame, used as an uplink sub-frame by a macro eNB, for downlink transmission through a flexible sub-frame, the present disclosure does not allow uplink transmission in an adjacent macro eNB or pico eNB through interference control of a macro eNB and other pico eNBs as in FIG. 4. Accordingly, a scheme for obtaining channel information including downlink interference from adjacent pico eNBs using the sub-frame for downlink transmission is provided.

The sub-frames indicated by reference numerals 702 to 705 is based on a situation in which the TDD UL-DL configuration of the pico eNB is configuration #1 and sub-frames #3 and #8 are operated as flexible sub-frames. In TDD UL-DL configuration #1 701, sub-frames having the same pattern configure one uplink HARQ process and sub-frames having no pattern correspond to sub-frames having no uplink HARQ process.

A macro eNB or particular pico eNBs use sub-frames #3 and #8 for uplink transmission, and the pico eNB uses sub-frames #3 and #8 for downlink transmission. In a method proposed by the present disclosure for transmission of channel information, if a pico eNB uses sub-frames #3 702 and #8 703 of radio frame n for downlink data transmission, sub-frames #3 704 and #8 705 of the next radio frame, i.e. radio frame (n+1), are used for uplink data transmission.

Downlink sub-frame #9, which originally configures one UL HARQ process together with uplink sub-frame #3 702 in TDD UL-DL configuration #1 701, no longer configures one UL HARQ process together with uplink sub-frame #3 as sub-frame #3 702 is used for downlink data transmission. Accordingly, if a UL grant requesting channel information is transmitted in sub-frame #3 702 of radio frame n, the UE transmits uplink data including the channel information in sub-frame #3 704 of the next radio frame, i.e. radio frame (n+1). The UE measures the interference in only sub-frame #3 of radio frame n at the time of interference measurement for generation of the channel information. At the time of interference measurement, the UE does not average the interference together with interference in other sub-frames (e.g. sub-frame #3 used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame (i.e., when the UL-DL configuration is maintained), interference may be processed together in sub-frame #3 in the next radio frame. In the above description, "averaging" or "being processed together" implies inputting to one identical filter calculating the quantity of interference within a UE. A UE may include, in addition to a filter (or filters) for calculating the quantity of interference of a typical downlink sub-frame, a filter for calculating the quantity of interference in a sub-frame such as sub-frame #3 when there is signaling for another UL-DL reconfiguration.

Similarly, downlink sub-frame #4, which originally configures one UL HARQ process together with uplink sub-frame #8 703 in TDD UL-DL configuration #1 701, no longer configures one UL HARQ process together with uplink sub-frame #8 as sub-frame #8 703 is used for downlink data transmission. Accordingly, if a UL grant requesting channel information is transmitted in sub-frame 8 703 of radio frame n, the UE transmits uplink data including the channel information in sub-frame #8 705 of the next radio frame, i.e. radio frame (n+1). The UE measures the interference in only sub-frame #8 of radio frame n at the time of interference measurement for generation of the channel information. At the time of interference measurement, the UE does not average the interference together with interference in other sub-frames (e.g. sub-frame #8 used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame (i.e., when the UL-DL configuration is maintained), interference can be processed together in sub-frame #8 in the next radio frame. In the above description, "averaging" or "being processed together" implies inputting to one identical filter calculating the quantity of interference within a UE. A UE may include, in addition to a filter (or filters) for calculating the quantity of interference of a typical downlink sub-frame, a filter for calculating the quantity of interference in a sub-frame such as sub-frame #8 when there is signaling for another UL-DL reconfiguration.

In this event, the uplink data may be configured by only channel information or may be multiplexed with general data. Through the method described above, an uplink sub-frame can be used for downlink data transmission through a flexible sub-frame configuration in sub-frames of one radio frame for every two radio frames.

Figure 8A:
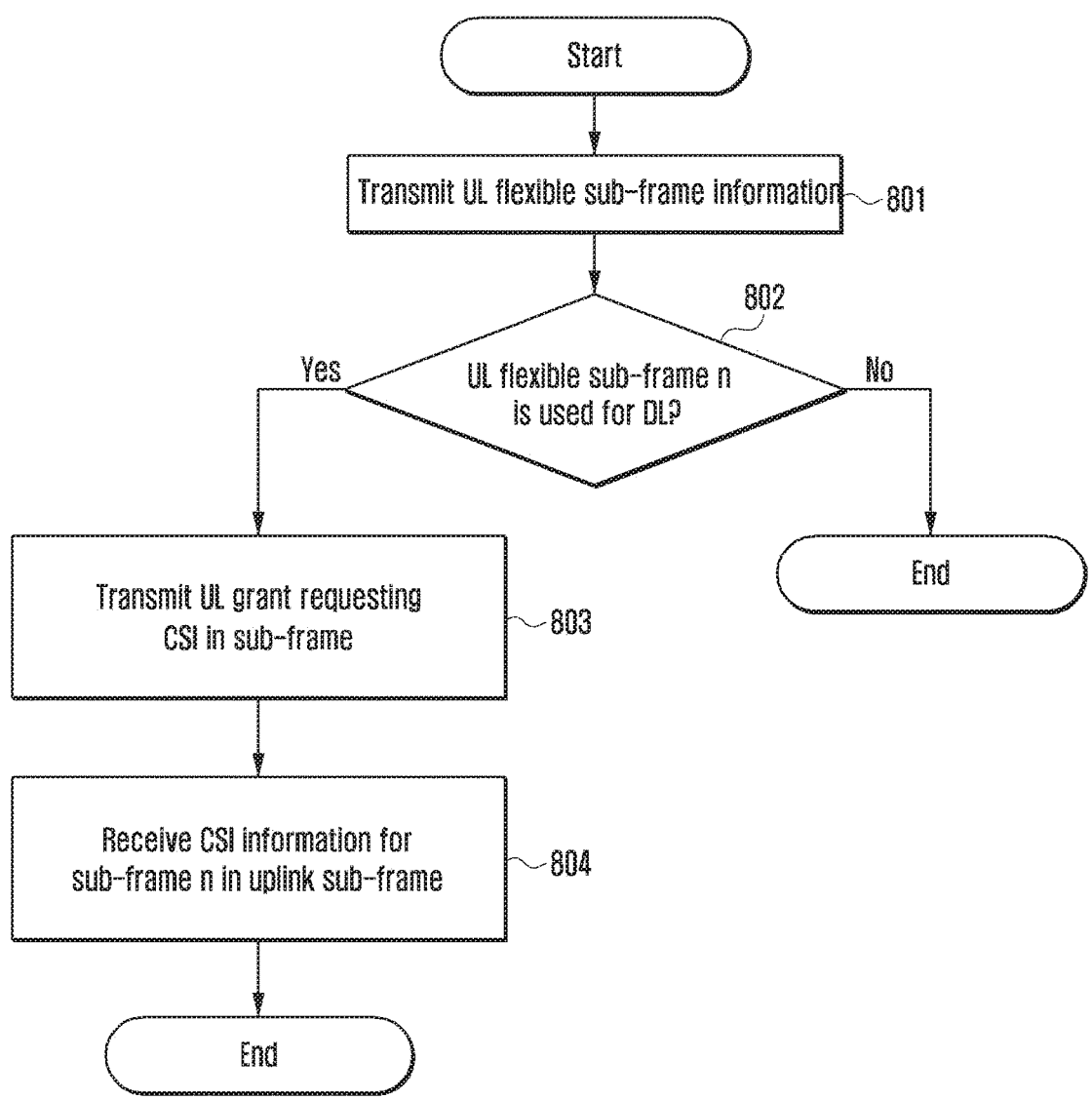
FIGS. 8A and 8B are flowcharts illustrating an eNB operation and a UE operation for transmission of channel information through flexible sub-frames in a communication system according to an embodiment of the present disclosure.
Figure 8B:
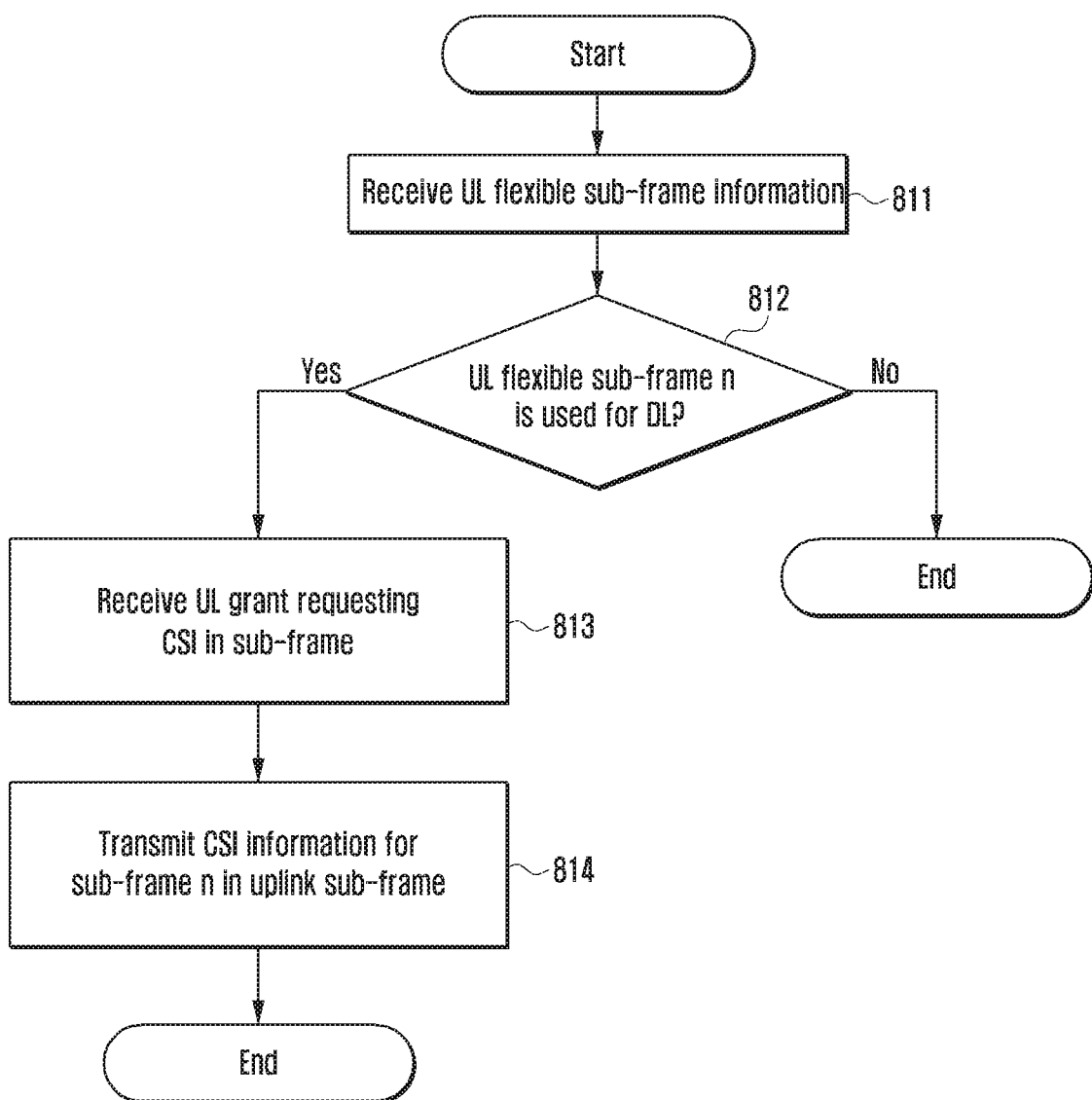

FIGS. 8A and 8B are flowcharts illustrating an eNB operation and a UE operation, respectively, for transmission of channel information through flexible sub-frames in a communication system according to an embodiment of the present disclosure.

Referring to FIG. 8A, in operation 801, an eNB transmits related information to a UE in order to use a UL flexible sub-frame of a current TDD UL-DL configuration in downlink transmission. The information on the flexible sub-frame can be transmitted to the UE through one of system information, RRC signaling, MAC signaling, and physical layer signaling.

In operation 802, the eNB determines whether flexible sub-frame n is used for downlink transmission. When flexible sub-frame n is used for downlink transmission, the eNB transmits a UL grant requesting channel information to the UE in sub-frame n according to the method described above with reference to FIG. 7 in operation 803.

Further, in operation 804, the eNB receives channel information of sub-frame n of a previous radio frame from the UE in sub-frame n of a radio frame having a next index according to the method disclosure described above with reference to FIG. 7.

As a result of the determination in operation 802, if flexible sub-frame n is used for uplink transmission without change, it is unnecessary to transmit downlink channel information for flexible sub-frame n to the UE.

Referring to FIG. 8B, in operation 811, a UE receives related information from an eNB in order to use a UL flexible sub-frame of a current TDD UL-DL configuration in downlink transmission. The information on the flexible sub-frame can be received from the eNB through one of system information, RRC signaling, MAC signaling, and physical layer signaling.

In operation 812, the UE determines whether flexible sub-frame n is used for downlink transmission. When flexible sub-frame n is used for downlink transmission, the UE receives a UL grant requesting channel information from the eNB in sub-frame n according to the method proposed by the present disclosure described above with reference to FIG. 7 in operation 813.

The UE measures the interference in only sub-frame #3 at the time of interference measurement for generation of channel information, after or before requesting the channel information. At the time of interference measurement, the UE does not average the interference together with interference in other sub-frames (e.g. sub-frame n used for uplink transmission after another UL-DL reconfiguration in a next radio frame, sub-frames belonging to the same sub-frame set, or sub-frames belonging to the same CSI process). This is because the sub-frame in the example described above may be used for uplink transmission in the next radio frame. When another UL-DL reconfiguration is not performed in the next radio frame (i.e., when the UL-DL configuration is maintained), interference can be processed together in sub-frame #n in the next radio frame. In the above description, "averaging" or "being processed together" implies inputting to one identical filter calculating the quantity of interference within a UE. A UE may include, in addition to a filter (or filters) for calculating the quantity of interference of a typical downlink sub-frame, a filter for calculating the quantity of interference in a sub-frame such as sub-frame #n when there is signaling for another UL-DL reconfiguration.

In operation 814, the UE transmits channel information of sub-frame n of a previous radio frame from the UE in sub-frame n of a radio frame having a next index according to the method described above with reference to FIG. 7.

As a result of the determination in operation 811, if flexible sub-frame n is used for uplink transmission without change, it is unnecessary to receive downlink channel information for flexible sub-frame n from the eNB.

Figure 9:
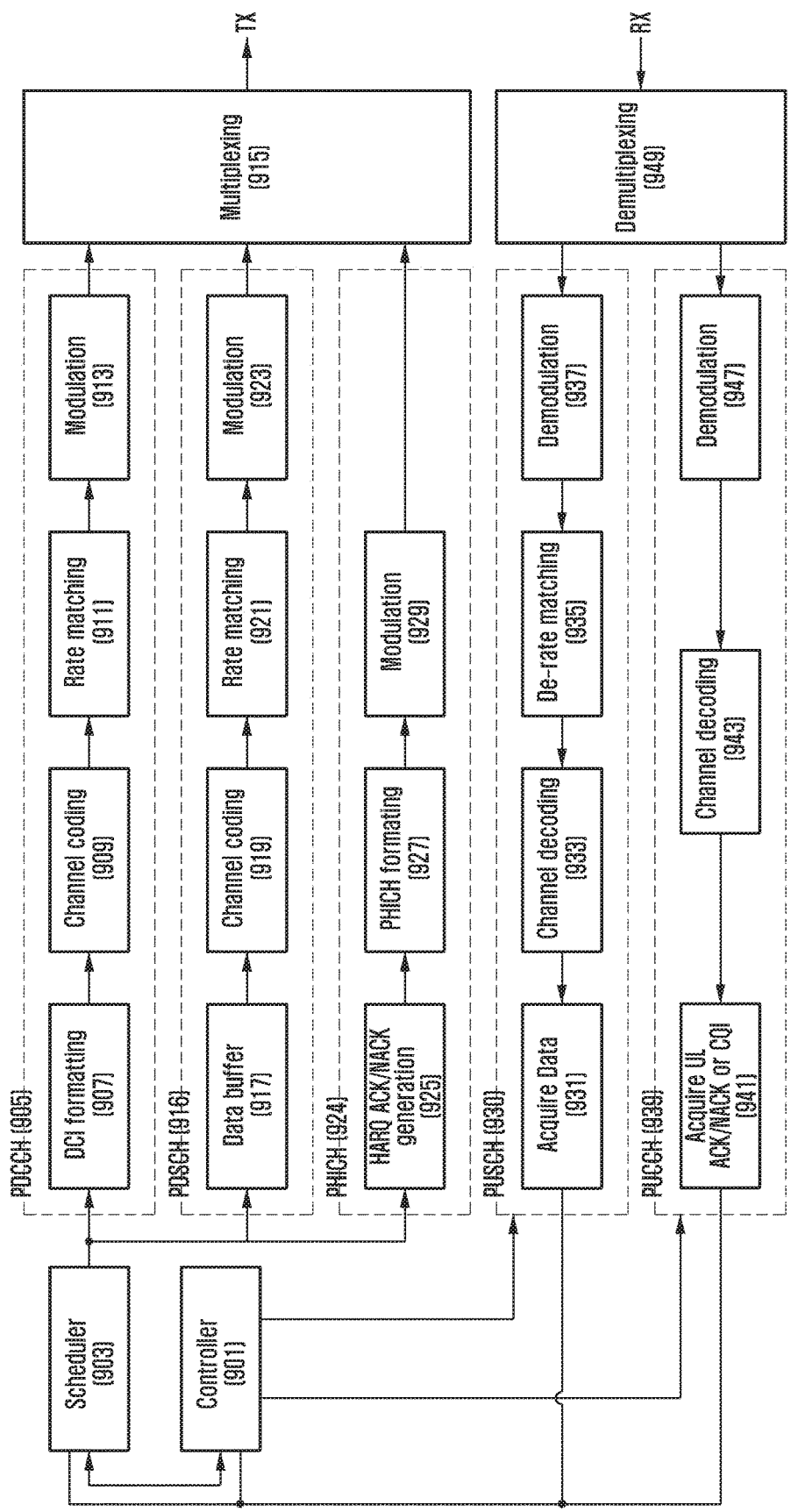
FIG. 9 is a block diagram illustrating an eNB apparatus in a communication system according to an embodiment of the present disclosure.

FIG. 9 is a block diagram illustrating an eNB apparatus in a communication system according to an embodiment of the present disclosure.

Referring to FIG. 9, the eNB includes a transmission unit including a PDCCH block 905, a PDSCH block 916, a PHICH block 924, and a multiplexer 915; a reception unit including a PUSCH block 930, a PUCCH block 939, and a demultiplexer 949; a controller 901, and a scheduler 903.

In the transmission unit, the PDCCH block 905 includes a DCI formatter 907, a channel coder 909, a rate matching unit 911, and a modulator 913. The PDSCH block 916 includes a data buffer 917, a channel coder 919, a rate matching unit 921, and a modulator 923. The PHICH block 924 includes an HARQ ACK/NACK generator 925, a PHICH formatter 927, and a modulator 929.

In the reception unit, the PUCCH block 930 includes a demodulator 937, a de-rate matching unit 935, a channel decoder 933, and a data acquisition unit 931. The PUCCH block includes a demodulator 947, a channel decoder 943, and an uplink ACK/NAK or CQI acquisition unit 941.

The controller 901 refers to the quantity of available resources within the system and the like by using the channel information received from the UE according to the present disclosure and then notifies the scheduler 903 and the PDSCH block 916 of information.

In the PDCCH block 905, a DCI is configured under the control of the scheduler 903, an error correction capability is provided to the DCI, the DCI is rate-matched by the rate matching unit 911 in accordance with the quantity of resources to be actually mapped, and the DCI is multiplexed with other signals by the multiplexer 915.

In the PDSCH block 916, data to be transmitted is extracted from the data buffer 917 under the control of the scheduler 903, the channel coder 919 provides an error correction capability to the extracted data, the rate matching unit 921 rate-matches the data in accordance with the quantity of resources to be actually mapped, the modulator 923 modulates the rate-matched data, and the multiplexer 915 multiplexes the modulated data with other signals.

In the PHICH block 924, under the control of the scheduler 903, the HARQ ACK/NACK generator 925 generates an HARQ ACK/NACK for a PUSCH received from the UE. The HARQ ACK/NACK is configured to accord with the PHICH structure by the PHICH formatter 927, is modulated by the modulator 929, and is then multiplexed with other signals by the multiplexer 915.

An OFDM signal is generated from the multiplexed signals and is then transmitted to the UE.

In the PUSCH block 730, the demultiplexer 949 separates a PUSCH signal from signals received from the UE, the demodulator 937 demodulates the PUSCH, the de-rate matching unit 935 reconfigures symbols before rate matching from the demodulated PUSCH signal, the channel decoder 933 decodes the reconfigured symbols, and the data acquisition unit 931 acquires PUSCH data from the decoded symbols. The data acquisition unit 931 notifies the scheduler 903 whether a result of the decoding has an error, to adjust the downlink HARQ ACK/NACK generation, and transfers the information on whether the result of the decoding has an error to the controller 901, so as to adjust the downlink HARQ ACK/NACK transmission timing.

In the PUCCH block 939, the demultiplexer 949 separates a PUCCH signal from signals received from the UE. The demodulator 947 demodulates the separated PUCCH signal, the channel decoder 943 decodes the demodulated PUCCH signal, and the uplink ACK/NAK or CQI acquisition unit 941 acquires an uplink ACK/NAK or CQI from the decoded PUCCH signal. The acquired uplink CQI is provided to the scheduler 903 to be used in determining a Modulation and Coding Scheme (MCS) for transmission of the PDSCH.

In a sub-frame operation device of a pico eNB, a controller reconfigures a TDD UL-DL configuration or configures an uplink sub-frame as a flexible sub-frame.

The controller 901 uses a sub-frame, which is used for uplink data transmission by a macro eNB, for downlink transmission. The controller analyzes channel information of the sub-frame received from a UE of a pico eNB to use the analyzed channel information in scheduling downlink data in the sub-frame thereafter.

The controller 901 transmits reconfiguration information for reconfiguration of a TDD uplink/downlink to a UE and determines whether an uplink HARQ process exists in a predetermined sub-frame changed from an uplink sub-frame to a downlink sub-frame by the reconfiguration. As a result of the determination, when such an uplink HARQ process does not exist, the controller 901 transmits uplink data scheduling information including a request for channel information to the UE in the predetermined sub-frame or in a first sub-frame in which an uplink HARQ process exists after the predetermined sub-frame. The controller 901 controls to receive channel information transmitted from the UE in a sub-frame at a predetermined timing.

The controller 901 may transmit reconfiguration information for reconfiguration of TDD uplink/downlink to a UE and transmit uplink data scheduling information including a request for channel information of the UE to the UE. The controller 901 may control to receive information on interference measured only in a first sub-frame changed from an uplink sub-frame to a downlink sub-frame through the reconfiguration from the UE in an uplink sub-frame according to a predetermined timing.

The timing for receiving channel information from the UE has been described above, so a detailed description thereof is omitted here.

Figure 10:
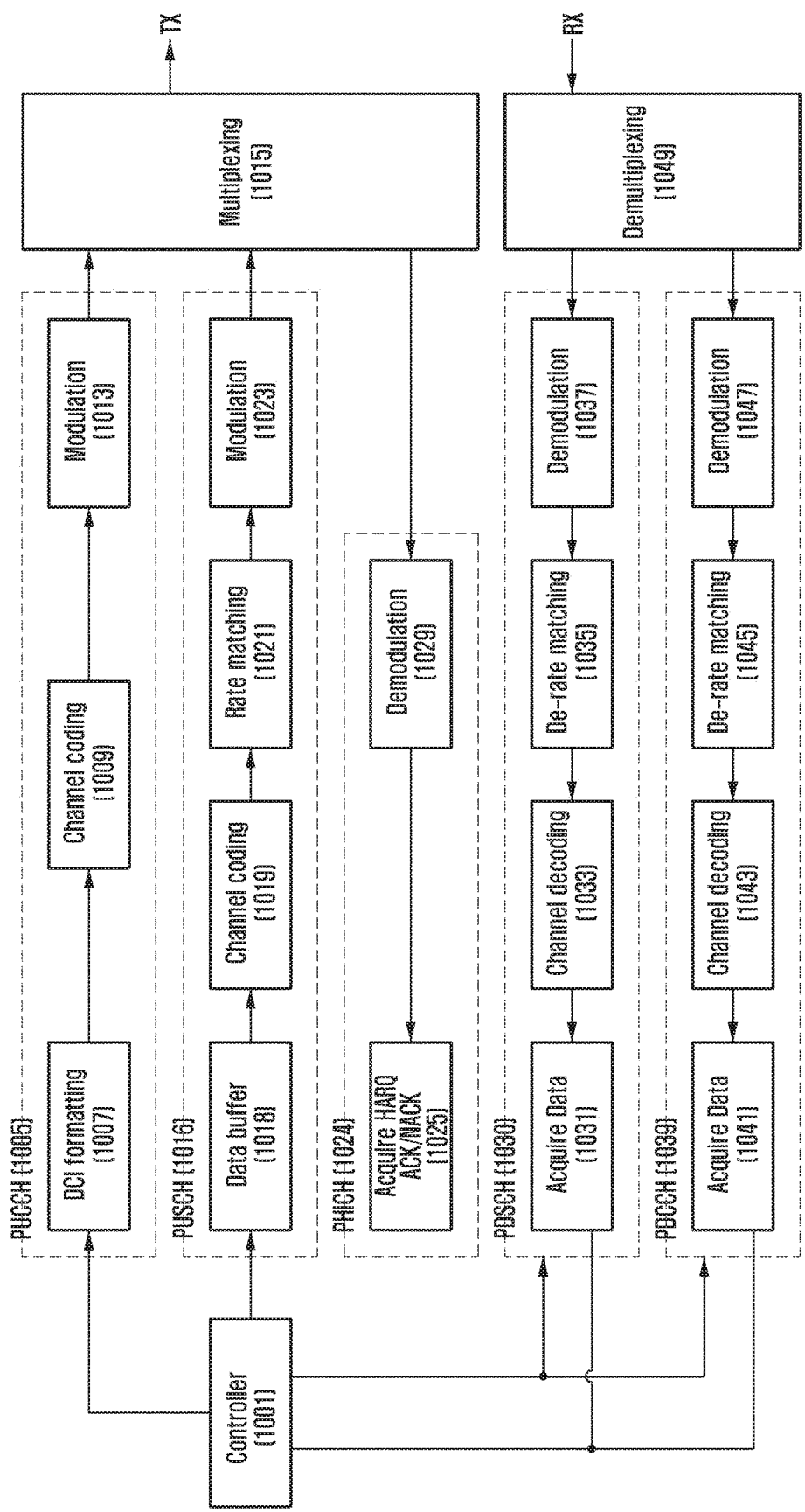
FIG. 10 is a block diagram illustrating a UE apparatus in a communication system according to an embodiment of the present disclosure.

FIG. 10 is a block diagram illustrating a UE apparatus in a communication system according to an embodiment of the present disclosure.

Referring to FIG. 10, the UE includes a transmission unit including a PUCCH block 1005, a PUSCH block 1016, and a multiplexer 1015; a reception unit including a PHICH block 1024, a PDSCH block 1030, a PDCCH block 1039, and a demultiplexer 1049; and a controller 1001.

In the reception unit, the PUCCH block 1005 includes a UCI formatter 1007, a channel coder 1009, and a modulator 1013. The PUSCH block 1016 includes a data buffer 1018, a channel coder 1019, a rate matching unit 1021, and a modulator 1023.

In the transmission unit, the PHICH block 1024 includes a HARQ ACK/NACK acquisition unit 1025 and a modulator 1029. The PDSCH block 1030 includes a demodulator 1037, a de-rate matching unit 1035, a channel decoder 1033, and a data acquisition unit 1031. The PDCCH block 1039 includes a demodulator 1047, a de-rate matching unit 1045, a channel decoder 1043, and a DCI acquisition unit 1041.

The controller 1001 determines whether a flexible sub-frame is used for downlink transmission from a DCI received from an eNB and notifies the determined information to the PUCCH block 1005, the PUSCH block 1016, the PHICH block 1024, the PDSCH block 1030, and the PDCCH block 1039, so as to enable non-periodic channel information measurement. The non-periodic channel information measurement and transmission follow the method as described above.

In the PUCCH block 1005, the UCI formatter 1007 configures an HARQ ACK/NACK or CQI according to the present disclosure by using Uplink Control Information (UCI) under a control of the controller 1001, the channel coder 1009 provides an error correction capability to the HARQ ACK/NACK or CQI, the modulator 1013 modulates the HARQ ACK/NACK or CQI provided with the error correction capability, and the multiplexer 1015 multiplexes the modulated HARQ ACK/NACK or CQI with other signals.

In the PUSCH block 1016, data to be transmitted is extracted from the data buffer 1018, the channel coder 1019 provides an error correction capability to the extracted data, the rate matching unit 1021 rate-matches the data in accordance with the quantity of resources to be actually mapped, the modulator 1023 modulates the rate-matched data, and the multiplexer 1015 multiplexes the modulated data with other signals.

A Single Carrier-Frequency Division Multiple Access (SC-FDMA) is generated from the multiplexed signals and is then transmitted to the eNB.

In the PHICH block 1024, the demultiplexer 1049 separates a PHICH signal from signals received from the UE, the demodulator 1029 demodulates the separated PHICH signal, and the HARQ ACK/NACK acquisition unit 1025 acquires a HARQ ACK/NACK for a PUSCH from the demodulated PHICH signal.

In the PDSCH block 1030, the demultiplexer 1049 separates a PDSCH signal from signals received from an eNB in a flexible sub-frame according to the present disclosure, the demodulator 1037 demodulates the separated PDSCH signal, the de-rate matching unit 1035 reconfigures symbols before rate matching from the demodulated PDSCH signal, the channel decoder 1033 decodes the reconfigured symbols, and the data acquisition unit 1031 acquires PDSCH data from the decoded symbols. The data acquisition unit 1031 notifies the PUCCH block 1005 of information on whether a result of the decoding has an error, to adjust uplink HARQ ACK/NACK generation.

In the PDCCH block 1039, the demultiplexer 1049 separates a PDCCH signal from signals received from an eNB, the demodulator 1047 demodulates the separated PDCCH signal, the channel decoder 1033 decodes the demodulated PDCCH signal, and the DCI acquisition unit 1041 acquires DCI from the decoded PDCCH signal.

In a UE of a pico eNB, the controller 1001 measures non-periodic channel information in order to use a sub-frame, which is used for uplink transmission by a macro UE, for downlink transmission. The controller transmits the non-periodic channel information in an uplink sub-frame according to the present disclosure.

The controller 1001 receives reconfiguration information for reconfiguration of a TDD uplink/downlink from an eNB and determines whether an uplink HARQ process exists in a predetermined sub-frame changed from an uplink sub-frame to a downlink sub-frame by the reconfiguration. As a result of the determination, when such an uplink HARQ process does not exist, the controller 1001 receives uplink data scheduling information including a request for channel information from the eNB in the predetermined sub-frame or in a first sub-frame in which an uplink HARQ process exists after the predetermined sub-frame. The controller 1001 controls to transmit channel information of the UE to the eNB in a sub-frame at a predetermined timing.

The controller 1001 can receive reconfiguration information for reconfiguration of a TDD uplink/downlink from an eNB and measure interference in the first sub-frame changed from an uplink sub-frame to a downlink sub-frame by the reconfiguration. The controller 1001 can control to transmit information on the interference measured in only the first sub-frame to the eNB in an uplink sub-frame according to a predetermined timing.

The timing for transmitting channel information to the eNB by the UE has been described above, so a detailed description thereof is omitted here.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a time division duplex (TDD) communication system using an uplink-downlink (UL-DL) configuration, the method comprising:
    receiving configuration information on configuring a first UL-DL configuration;
    transmitting data based on the first UL-DL configuration;
    receiving reconfiguration information on reconfiguring of the first UL-DL configuration to a second UL-DL configuration;
    measuring an interference in a downlink subframe based on the reconfigured second UL-DL configuration; and
    transmitting information on the interference to a base station.

2. The method of claim 1, wherein the measuring of the interference further comprises:
    measuring the interference in at least one downlink sub-frame of a radio frame that is indicated by the second UL-DL configuration.

3. The method of claim 1, wherein the configuration information is included in a system information block (SIB).

4. The method of claim 1, wherein the reconfiguration information is included in downlink control information (DCI) format 1C.

5. A terminal in a time division duplex (TDD) communication system using an uplink-downlink (UL-DL) configuration, the terminal comprising:
- a transceiver configured to transmit and receive a signal; and
- a controller coupled with the transceiver and configured to:
  - control the transceiver to receive configuration information on configuring a first UL-DL configuration,
  - control the transceiver to transmit data based on the first UL-DL configuration,
  - control the transceiver to receive reconfiguration information on a reconfiguring of the first UL-DL configuration to a second UL-DL configuration,
  - measure an interference in a downlink subframe based on the reconfigured second UL-DL configuration, and
  - control the transceiver to transmit information on the interference to a base station.

6. The terminal of claim 5, wherein the controller is further configured to:
- measure the interference in at least one downlink subframe of a radio frame that is indicated by the second UL-DL configuration.

7. The terminal of claim 5, wherein the configuration information is included in a system information block (SIB).

8. The terminal of claim 5, wherein the reconfiguration information is included in downlink control information (DCI) format 1C.

9. A method by a base station in a time division duplex (TDD) communication system using an uplink-downlink (UL-DL) configuration, the method comprising:
- transmitting configuration information on configuring a first UL-DL configuration to a terminal;
- receiving data based on the first UL-DL configuration from the terminal;
- transmitting reconfiguration information on reconfiguring of the first UL-DL configuration to a second UL-DL configuration; and
- receiving information on interference from the terminal, if the interference is measured, by the terminal, in a downlink subframe based on the reconfigured second UL-DL configuration.

10. The method of claim 9, wherein the interference is measured in at least one downlink subframe of a radio frame that is indicated by the second UL-DL configuration.

11. The method of claim 9, wherein the configuration information is included in a system information block (SIB).

12. The method of claim 9, wherein the reconfiguration information is included in downlink control information (DCI) format 1C.

13. A base station in a time division duplex (TDD) communication system using an uplink-downlink (UL-DL) configuration, the base station comprising:
- a transceiver configured to transmit and receive a signal; and
- a controller coupled with the transceiver and configured to:
  - control the transceiver to transmit configuration information on configuring a first UL-DL configuration to a terminal,
  - control the transceiver to receive data based on the first UL-DL configuration from the terminal,
  - control the transceiver to transmit reconfiguration information on reconfiguring of the first UL-DL configuration to a second UL-DL configuration, and
  - control the transceiver to receive information on interference from the terminal, if the interference is measured by the terminal in a downlink subframe based on the reconfigured second UL-DL configuration.

14. The base station of claim 13, wherein the interference is measured in at least one downlink subframe of a radio frame that is indicated by the second UL-DL configuration.

15. The base station of claim 13, wherein the configuration information is included in a system information block (SIB).

16. The base station of claim 13, wherein the reconfiguration information is included in downlink control information (DCI) format 1C.

* * * * *